(12) United States Patent
Carin et al.

(10) Patent No.: US 8,156,662 B2
(45) Date of Patent: Apr. 17, 2012

(54) SYSTEMS FOR PREVENTION OF HAP EMISSIONS AND FOR EFFICIENT DRYING/DEHYDRATION PROCESSES

(75) Inventors: Christianne Carin, Priddis (CA); Brian N. Gorbell, Priddis (CA); Christianne Carin, legal representative, Priddis (CA); Alvin W. Fedkenheuer, Calgary (CA); John S. Jonasson, Tisdale (CA); Alexander Starosud, Calgary (CA)

(73) Assignee: Earthrenew, Inc., Half Moon Bay, CA (US)

( * ) Notice: Subject to any disclaimer, the term of this patent is extended or adjusted under 35 U.S.C. 154(b) by 37 days.

(21) Appl. No.: 12/607,481

(22) Filed: Oct. 28, 2009

(65) Prior Publication Data

US 2010/0139116 A1 Jun. 10, 2010

Related U.S. Application Data

(62) Division of application No. 11/335,153, filed on Jan. 18, 2006, now Pat. No. 7,610,692.

(51) Int. Cl.
 *F26B 11/02* (2006.01)
(52) U.S. Cl. ........... 34/516; 34/493; 34/499; 60/709; 60/702; 210/758; 210/173; 110/346; 110/342
(58) Field of Classification Search ............ 34/516, 34/443, 393, 487, 499, 90, 282; 60/709, 60/772; 210/758, 173; 110/342, 346
See application file for complete search history.

(56) References Cited

U.S. PATENT DOCUMENTS

| | | | |
|---|---|---|---|
| 3,050,383 A | 8/1962 | Wilson | |
| 3,262,214 A | 7/1966 | Webb | |
| 3,269,824 A | 8/1966 | Aswell | |
| 3,285,704 A | 11/1966 | Sackett, Sr. | |
| 3,463,612 A | 8/1969 | Whitsel, Jr. | |
| 3,564,723 A | 2/1971 | Pasey | |
| 3,589,313 A | 6/1971 | Smith et al. | |

(Continued)

FOREIGN PATENT DOCUMENTS

CH 641 891 A5 3/1984

(Continued)

OTHER PUBLICATIONS

"From Feather to Feed Gas-Fired Flashdryers Create Profitable By-Products from Once-Costly Wastes," Industrial Processing, Natural Gas Applications in Business & Industry, pp. A2-A4 (Publicly known at least as early as Jul. 19, 2004).

(Continued)

*Primary Examiner* — Stephen M. Gravini
(74) *Attorney, Agent, or Firm* — Merchant & Gould P.C.

(57) ABSTRACT

This invention discloses systems, apparatuses and methods for drying or dehydrating high moisture content feedstock to dry or low moisture products. The equipment systems comprise a gas turbine generator unit (preferred heat source), a dryer vessel and a processing unit, wherein the connection between the gas turbine and the dryer vessel directs substantially all the gas turbine exhaust into the dryer vessel and substantially precludes the introduction of air into the dryer vessel and wherein the processing unit forms the dried material from the dryer vessel into granules, pellets, flakes or other desired form for the final product. The systems, apparatuses and methods of this invention also provide for prevention of release of HAP, including VOC, emissions from manufacturing facilities in conjunction with or independent of the above treatment of high water content feedstock.

19 Claims, 5 Drawing Sheets

U.S. PATENT DOCUMENTS

| | | | |
|---|---|---|---|
| 3,645,006 A | 2/1972 | Anderson | |
| 3,667,131 A | 6/1972 | Stephanoff | |
| 3,668,785 A | 6/1972 | Rodwin | |
| 3,735,600 A | 5/1973 | Dowdell et al. | |
| 3,749,162 A | 7/1973 | Anders | |
| 3,783,527 A | 1/1974 | Driscoll et al. | |
| 3,805,715 A | 4/1974 | Keller | |
| 3,866,411 A | 2/1975 | Marion et al. | |
| 3,868,817 A | 3/1975 | Marion et al. | |
| 3,905,796 A | 9/1975 | Ghelfi | |
| 3,926,743 A | 12/1975 | Cywin | |
| 3,993,458 A | 11/1976 | Antal, Jr. | |
| 3,997,388 A | 12/1976 | Simon | |
| 4,007,786 A | 2/1977 | Schlinger | |
| 4,028,030 A | 6/1977 | Imhof | |
| 4,032,305 A | 6/1977 | Squires | |
| 4,043,393 A | 8/1977 | Fisher et al. | |
| 4,058,590 A | 11/1977 | Ruble | |
| 4,074,981 A * | 2/1978 | Slater | 48/197 R |
| 4,075,831 A | 2/1978 | McGann | |
| 4,082,532 A | 4/1978 | Imhof | |
| 4,099,336 A | 7/1978 | Maffet | |
| 4,121,349 A | 10/1978 | Maffet | |
| 4,121,912 A | 10/1978 | Barber et al. | |
| 4,126,668 A | 11/1978 | Erickson | |
| 4,128,946 A | 12/1978 | Maffet | |
| 4,132,065 A | 1/1979 | McGann | |
| 4,137,648 A | 2/1979 | Rhodes | |
| 4,158,680 A | 6/1979 | McGann | |
| 4,160,479 A | 7/1979 | Richardson et al. | |
| 4,164,124 A | 8/1979 | Taylor et al. | |
| 4,172,857 A | 10/1979 | Pavilon | |
| 4,184,322 A | 1/1980 | Paull et al. | |
| 4,220,463 A | 9/1980 | Van Hijfte et al. | |
| 4,247,302 A | 1/1981 | Woldy et al. | |
| 4,248,604 A | 2/1981 | Woldy et al. | |
| 4,255,232 A | 3/1981 | Ries | |
| 4,308,463 A | 12/1981 | Giras et al. | |
| 4,321,150 A * | 3/1982 | McMullen | 210/769 |
| 4,321,151 A | 3/1982 | McMullen | |
| 4,353,207 A | 10/1982 | Lee | |
| 4,402,710 A | 9/1983 | Stellaccio | |
| 4,424,766 A | 1/1984 | Boyle | |
| 4,430,046 A | 2/1984 | Cirrito | |
| 4,436,531 A | 3/1984 | Estabrook et al. | |
| 4,454,427 A | 6/1984 | Sosnowski et al. | |
| 4,469,488 A | 9/1984 | Calderon | |
| 4,472,363 A | 9/1984 | Poller et al. | |
| 4,524,581 A | 6/1985 | Cascone et al. | |
| 4,546,502 A | 10/1985 | Lew | |
| 4,571,949 A | 2/1986 | Moke | |
| 4,581,829 A | 4/1986 | Becker et al. | |
| 4,609,328 A | 9/1986 | Cirrito | |
| 4,618,451 A * | 10/1986 | Gent | 252/373 |
| 4,682,985 A | 7/1987 | Kohl | |
| 4,692,172 A | 9/1987 | Stellaccio et al. | |
| 4,696,638 A * | 9/1987 | DenHerder | 431/4 |
| 4,725,380 A | 2/1988 | Pinto | |
| 4,728,341 A | 3/1988 | Nielsen | |
| 4,733,528 A | 3/1988 | Pinto | |
| 4,743,282 A | 5/1988 | Mehra | |
| 4,743,287 A | 5/1988 | Robinson | |
| 4,745,868 A | 5/1988 | Seabury | |
| 4,750,986 A | 6/1988 | Pinto | |
| 4,766,823 A | 8/1988 | Seabury | |
| 4,772,420 A | 9/1988 | Pinto et al. | |
| 4,776,860 A | 10/1988 | Najjar et al. | |
| 4,778,484 A | 10/1988 | Najjar et al. | |
| 4,818,405 A | 4/1989 | Vroom et al. | |
| 4,819,571 A | 4/1989 | Hallett | |
| 4,832,831 A | 5/1989 | Meyer et al. | |
| 4,842,615 A | 6/1989 | Meyer et al. | |
| 4,854,937 A | 8/1989 | Meyer et al. | |
| 4,880,439 A | 11/1989 | Najjar et al. | |
| 4,881,366 A | 11/1989 | Nurse | |
| 4,898,107 A | 2/1990 | Dickinson | |
| 4,900,429 A | 2/1990 | Richardson | |
| 4,910,228 A | 3/1990 | Lywood | |
| 4,913,799 A | 4/1990 | Gortsema et al. | |
| 4,927,430 A | 5/1990 | Calderon | |
| 4,935,038 A | 6/1990 | Wolf | |
| 4,953,479 A | 9/1990 | Keller et al. | |
| 4,957,049 A | 9/1990 | Strohmeyer, Jr. | |
| 4,957,544 A | 9/1990 | Najjar | |
| 4,971,601 A | 11/1990 | Najjar et al. | |
| 4,974,335 A | 12/1990 | Bege et al. | |
| 4,997,469 A | 3/1991 | Moore | |
| 4,999,992 A | 3/1991 | Nurse | |
| 4,999,995 A | 3/1991 | Nurse | |
| 5,000,099 A | 3/1991 | Dickinson | |
| 5,004,592 A | 4/1991 | Pinto | |
| 5,039,510 A | 8/1991 | Pinto | |
| 5,048,284 A | 9/1991 | Lywood et al. | |
| 5,050,375 A | 9/1991 | Dickinson | |
| 5,079,852 A | 1/1992 | Nakayama et al. | |
| 5,082,251 A | 1/1992 | Whipp | |
| 5,083,870 A | 1/1992 | Sindelar et al. | |
| 5,104,419 A | 4/1992 | Funk | |
| 5,113,597 A | 5/1992 | Sylla | |
| 5,117,623 A | 6/1992 | Arundale | |
| 5,132,007 A | 7/1992 | Meyer et al. | |
| 5,134,944 A | 8/1992 | Keller et al. | |
| 5,142,794 A | 9/1992 | Meiners | |
| 5,192,486 A | 3/1993 | Whipp | |
| 5,201,172 A | 4/1993 | Hakulin et al. | |
| 5,211,724 A | 5/1993 | Khan et al. | |
| 5,230,211 A | 7/1993 | McMahon et al. | |
| 5,251,433 A | 10/1993 | Wallace | |
| 5,252,609 A | 10/1993 | Pinto | |
| 5,261,225 A | 11/1993 | Dickinson | |
| 5,295,350 A | 3/1994 | Child et al. | |
| 5,312,843 A | 5/1994 | Yamauchi et al. | |
| 5,318,696 A | 6/1994 | Kowalski | |
| 5,319,176 A | 6/1994 | Alvi et al. | |
| 5,319,924 A | 6/1994 | Wallace et al. | |
| 5,343,632 A | 9/1994 | Dinh | |
| 5,345,693 A | 9/1994 | Skjold | |
| 5,345,756 A | 9/1994 | Jahnke et al. | |
| 5,349,810 A | 9/1994 | Landalv | |
| 5,354,349 A | 10/1994 | Inoue | |
| 5,388,395 A | 2/1995 | Scharpf et al. | |
| 5,393,317 A | 2/1995 | Robinson | |
| 5,394,686 A | 3/1995 | Child et al. | |
| 5,401,282 A | 3/1995 | Leininger et al. | |
| 5,403,366 A | 4/1995 | Leininger et al. | |
| 5,428,906 A | 7/1995 | Lynam et al. | |
| 5,451,738 A | 9/1995 | Alvi et al. | |
| 5,466,273 A | 11/1995 | Connell | |
| 5,471,937 A | 12/1995 | Kosky et al. | |
| 5,474,686 A | 12/1995 | Barr | |
| 5,479,462 A | 12/1995 | Yamauchi et al. | |
| 5,485,728 A | 1/1996 | Dickinson | |
| 5,527,464 A | 6/1996 | Bartha et al. | |
| 5,535,528 A | 7/1996 | Finkam | |
| 5,541,386 A | 7/1996 | Alvi et al. | |
| 5,557,873 A | 9/1996 | Lynam et al. | |
| 5,570,517 A | 11/1996 | Luker | |
| 5,584,171 A | 12/1996 | Sato et al. | |
| 5,588,222 A | 12/1996 | Thompson | |
| 5,592,811 A | 1/1997 | Dodge et al. | |
| 5,596,815 A | 1/1997 | Rice et al. | |
| 5,626,638 A | 5/1997 | Valkanas | |
| 5,636,507 A | 6/1997 | Rajamani et al. | |
| 5,644,928 A | 7/1997 | Uda et al. | |
| 5,650,127 A | 7/1997 | Campbell et al. | |
| 5,653,872 A | 8/1997 | Cohan | |
| 5,676,729 A | 10/1997 | Elrod et al. | |
| 5,685,138 A * | 11/1997 | Rao et al. | 60/781 |
| 5,685,153 A | 11/1997 | Dickinson et al. | |
| 5,693,296 A | 12/1997 | Holtzapple et al. | |
| 5,695,130 A * | 12/1997 | Csendes | 241/19 |
| 5,695,532 A | 12/1997 | Johnson et al. | |
| 5,724,805 A | 3/1998 | Golomb et al. | |
| 5,727,903 A | 3/1998 | Borray et al. | |
| 5,730,922 A | 3/1998 | Babb et al. | |
| 5,740,667 A | 4/1998 | Bhattacharyya et al. | |
| 5,746,006 A | 5/1998 | Duske et al. | |

| | | | |
|---|---|---|---|
| 5,756,957 A | 5/1998 | Titus et al. | |
| 5,767,584 A | 6/1998 | Gore et al. | |
| 5,811,752 A | 9/1998 | Titus et al. | |
| 5,865,023 A | 2/1999 | Sorensen et al. | |
| 5,865,878 A | 2/1999 | Drnevich et al. | |
| 5,865,898 A | 2/1999 | Holtzapple et al. | |
| 5,866,752 A | 2/1999 | Goozner | |
| 5,888,389 A | 3/1999 | Griffith et al. | |
| 5,922,090 A | 7/1999 | Fujimura et al. | |
| 5,948,221 A | 9/1999 | Hsu | |
| 5,953,899 A * | 9/1999 | Rao et al. | 60/781 |
| 5,983,521 A | 11/1999 | Thompson | |
| 6,006,440 A | 12/1999 | Wiesenhofer et al. | |
| 6,018,471 A | 1/2000 | Titus et al. | |
| 6,029,370 A | 2/2000 | Cromeens | |
| 6,033,207 A | 3/2000 | Cummings | |
| 6,037,560 A | 3/2000 | Titus et al. | |
| 6,039,774 A | 3/2000 | McMullen et al. | |
| 6,093,380 A | 7/2000 | Lagana et al. | |
| 6,114,400 A | 9/2000 | Nataraj et al. | |
| 6,125,633 A | 10/2000 | Strohmeyer, Jr. | |
| 6,139,604 A | 10/2000 | Gottzmann et al. | |
| 6,141,796 A | 11/2000 | Cummings | |
| 6,149,773 A | 11/2000 | Grimshaw et al. | |
| 6,155,212 A | 12/2000 | McAlister | |
| 6,159,263 A | 12/2000 | Greer et al. | |
| 6,160,238 A | 12/2000 | Titus et al. | |
| 6,161,386 A * | 12/2000 | Lokhandwala | 60/649 |
| 6,171,499 B1 | 1/2001 | Bouchalat | |
| 6,172,124 B1 | 1/2001 | Wolflick et al. | |
| 6,173,508 B1 | 1/2001 | Strohmeyer, Jr. | |
| 6,182,584 B1 | 2/2001 | Gaudio | |
| 6,189,234 B1 | 2/2001 | Luker | |
| 6,190,429 B1 | 2/2001 | Fujimura et al. | |
| 6,197,081 B1 | 3/2001 | Schmidt | |
| 6,215,678 B1 | 4/2001 | Titus et al. | |
| 6,216,463 B1 | 4/2001 | Stewart | |
| 6,218,173 B1 | 4/2001 | Naito | |
| 6,230,480 B1 | 5/2001 | Rollins, III | |
| 6,233,844 B1 | 5/2001 | Gallego Juarez et al. | |
| 6,237,337 B1 | 5/2001 | Bronicki et al. | |
| 6,250,236 B1 | 6/2001 | Feizollahi | |
| 6,264,841 B1 | 7/2001 | Tudor | |
| 6,272,839 B1 | 8/2001 | Karl | |
| 6,277,894 B1 | 8/2001 | Agee et al. | |
| 6,293,121 B1 | 9/2001 | Labrador | |
| 6,293,985 B1 | 9/2001 | Phinney | |
| 6,306,917 B1 | 10/2001 | Bohn et al. | |
| 6,321,539 B1 | 11/2001 | Bronicki et al. | |
| 6,325,837 B1 | 12/2001 | Lentz | |
| 6,327,994 B1 | 12/2001 | Labrador | |
| 6,345,495 B1 | 2/2002 | Cummings | |
| 6,346,551 B1 | 2/2002 | Koyama et al. | |
| 6,350,394 B1 | 2/2002 | Ennis et al. | |
| 6,355,456 B1 | 3/2002 | Hallberg et al. | |
| 6,367,163 B1 | 4/2002 | Luker | |
| 6,381,963 B1 | 5/2002 | Graham | |
| 6,393,821 B1 | 5/2002 | Prabhu | |
| 6,398,851 B1 | 6/2002 | Bose | |
| 6,410,283 B1 | 6/2002 | Rehmat et al. | |
| 6,419,856 B1 | 7/2002 | Cirrito et al. | |
| 6,446,385 B1 | 9/2002 | Crutcher | |
| 6,451,589 B1 | 9/2002 | Dvorak | |
| 6,461,399 B1 | 10/2002 | Connell | |
| 6,471,898 B1 | 10/2002 | Barre et al. | |
| 6,484,417 B2 | 11/2002 | Tedman et al. | |
| 6,494,045 B2 | 12/2002 | Rollins, III | |
| 6,497,741 B2 | 12/2002 | Sower | |
| 6,497,856 B1 | 12/2002 | Lomax et al. | |
| 6,502,402 B1 | 1/2003 | Smith et al. | |
| 6,505,467 B1 | 1/2003 | Fjellhaug et al. | |
| 6,506,311 B2 | 1/2003 | DeGarmo et al. | |
| 6,510,695 B1 | 1/2003 | Fisher | |
| 6,517,600 B1 | 2/2003 | Dinel | |
| 6,519,926 B2 | 2/2003 | Hazlebeck | |
| 6,521,129 B1 | 2/2003 | Stamper et al. | |
| 6,524,632 B2 | 2/2003 | Kartchner | |
| 6,534,105 B2 | 3/2003 | Kartchner | |
| 6,554,061 B2 | 4/2003 | Jukkola et al. | |
| 6,578,354 B2 | 6/2003 | Hatamiya et al. | |
| 6,584,936 B2 | 7/2003 | Rivard | |
| 6,588,212 B1 | 7/2003 | Wallace et al. | |
| 6,588,504 B2 | 7/2003 | Wellington et al. | |
| 6,596,780 B2 | 7/2003 | Jahnke et al. | |
| 6,606,848 B1 | 8/2003 | Rollins, III | |
| 6,613,562 B2 | 9/2003 | Dvorak | |
| 6,615,589 B2 | 9/2003 | Allam et al. | |
| 6,616,901 B1 | 9/2003 | Lagana et al. | |
| 6,618,957 B2 * | 9/2003 | Novak et al. | 34/264 |
| 6,623,546 B1 | 9/2003 | Bourdel | |
| 6,623,719 B2 | 9/2003 | Lomax et al. | |
| 6,629,414 B2 | 10/2003 | Fischer | |
| 6,630,113 B1 | 10/2003 | Surma | |
| 6,634,576 B2 | 10/2003 | Verhoff et al. | |
| 6,638,757 B1 | 10/2003 | Teran et al. | |
| 6,645,267 B1 | 11/2003 | Dinel | |
| 6,648,931 B1 | 11/2003 | Rao | |
| 6,648,932 B1 | 11/2003 | Maton | |
| 6,673,845 B2 | 1/2004 | Price | |
| 6,676,716 B2 | 1/2004 | Fujimura et al. | |
| 6,682,578 B2 | 1/2004 | Sower | |
| 6,694,738 B2 | 2/2004 | Bronicki et al. | |
| 6,710,090 B2 | 3/2004 | Koyama et al. | |
| 6,716,360 B2 | 4/2004 | Titmas | |
| 6,722,845 B2 | 4/2004 | Chard et al. | |
| 6,734,331 B2 | 5/2004 | Cirrito et al. | |
| 6,737,026 B1 | 5/2004 | Bergh et al. | |
| 6,745,573 B2 | 6/2004 | Marin et al. | |
| 6,748,743 B1 | 6/2004 | Foster-Pegg | |
| 6,749,814 B1 | 6/2004 | Bergh et al. | |
| 6,756,140 B1 | 6/2004 | McAlister | |
| 6,790,317 B2 | 9/2004 | Antal, Jr. | |
| 6,790,349 B1 | 9/2004 | Sawyer | |
| 6,792,759 B2 | 9/2004 | Rollins, III | |
| 6,793,704 B2 | 9/2004 | You | |
| 6,794,417 B2 * | 9/2004 | O'Beck et al. | 518/700 |
| 6,804,964 B2 | 10/2004 | Bellows et al. | |
| 6,808,390 B1 | 10/2004 | Fung | |
| 6,824,682 B2 | 11/2004 | Branson | |
| 6,846,343 B2 | 1/2005 | Sower | |
| 6,854,279 B1 | 2/2005 | Digiovanni et al. | |
| 6,862,886 B2 | 3/2005 | Stewart | |
| 6,872,752 B2 | 3/2005 | O'Rear et al. | |
| 6,880,263 B2 | 4/2005 | Gasparini et al. | |
| 6,890,493 B1 | 5/2005 | Bergh et al. | |
| 6,895,760 B2 | 5/2005 | Kesseli | |
| 6,898,540 B2 | 5/2005 | Davies | |
| 6,902,934 B1 | 6/2005 | Bergh et al. | |
| 6,908,740 B2 | 6/2005 | Vandekerckhove et al. | |
| 6,911,058 B2 * | 6/2005 | Calderon et al. | 48/197 R |
| 6,923,004 B2 | 8/2005 | Chandran et al. | |
| 6,943,001 B2 | 9/2005 | Zhao et al. | |
| 6,944,967 B1 | 9/2005 | Staples | |
| 6,948,319 B2 | 9/2005 | Hayakawa et al. | |
| RE38,815 E | 10/2005 | Maese et al. | |
| 6,978,725 B2 | 12/2005 | Ramharter et al. | |
| 6,979,733 B2 | 12/2005 | Zhao et al. | |
| 6,981,994 B2 | 1/2006 | Drnevich et al. | |
| 6,984,305 B2 | 1/2006 | McAlister | |
| 6,987,792 B2 | 1/2006 | Do et al. | |
| 7,004,985 B2 * | 2/2006 | Wallace et al. | 48/198.3 |
| 7,012,038 B2 | 3/2006 | Alerasool et al. | |
| 7,017,330 B2 | 3/2006 | Bellows | |
| 7,024,796 B2 | 4/2006 | Carin et al. | |
| 7,024,800 B2 | 4/2006 | Gorbell et al. | |
| 7,028,478 B2 | 4/2006 | Prentice, III | |
| 7,029,273 B2 | 4/2006 | Fung et al. | |
| 7,041,272 B2 | 5/2006 | Keefer et al. | |
| 7,045,237 B2 | 5/2006 | Sridhar et al. | |
| 7,055,325 B2 | 6/2006 | Wolken | |
| 7,067,208 B2 | 6/2006 | Gottmann et al. | |
| 7,071,376 B1 | 7/2006 | Chapple et al. | |
| 7,073,578 B2 | 7/2006 | Vinegar et al. | |
| 7,078,035 B2 | 7/2006 | Short et al. | |
| 7,078,229 B2 | 7/2006 | Dvorak | |
| 7,086,823 B2 | 8/2006 | Michaud | |
| 7,087,331 B2 | 8/2006 | Keefer et al. | |
| 7,087,652 B2 | 8/2006 | Abbott et al. | |

| | | | | | | |
|---|---|---|---|---|---|---|
| 7,097,925 | B2 | 8/2006 | Keefer et al. | 7,596,939 B2 | 10/2009 | Kataoka et al. |
| 7,105,088 | B2 | 9/2006 | Schien et al. | 7,600,396 B2 | 10/2009 | Mak |
| 7,121,341 | B2 | 10/2006 | Vinegar et al. | 7,603,841 B2 * | 10/2009 | Steele et al. ............... 60/39.465 |
| 7,121,342 | B2 | 10/2006 | Vinegar et al. | 7,610,692 B2 | 11/2009 | Carin et al. |
| 7,131,259 | B2 | 11/2006 | Rollins, III | 7,617,617 B2 | 11/2009 | Carin et al. |
| 7,134,285 | B2 | 11/2006 | Primlani | 7,622,693 B2 | 11/2009 | Foret |
| 7,135,248 | B2 | 11/2006 | Finn et al. | 7,683,224 B2 * | 3/2010 | Connor ............................ 585/14 |
| 7,144,651 | B2 | 12/2006 | Finn et al. | 7,685,737 B2 * | 3/2010 | Gorbell et al. ..................... 34/86 |
| 7,148,261 | B2 | 12/2006 | Hershkowitz et al. | 7,694,523 B2 * | 4/2010 | Carin et al. ..................... 60/783 |
| 7,150,821 | B2 | 12/2006 | O'Rear et al. | 7,781,695 B2 * | 8/2010 | Blutke et al. ............. 219/121.36 |
| 7,162,875 | B2 | 1/2007 | Fletcher et al. | 7,794,690 B2 * | 9/2010 | Abatzoglou et al. .......... 423/651 |
| 7,166,796 | B2 | 1/2007 | Nicoloau | 7,866,060 B2 * | 1/2011 | Carin et al. ..................... 34/487 |
| 7,167,240 | B2 | 1/2007 | Stagg | 7,882,646 B2 * | 2/2011 | Gorbell et al. ................. 34/514 |
| 7,169,821 | B2 | 1/2007 | Branson | 7,906,559 B2 * | 3/2011 | Olah et al. ..................... 518/704 |
| 7,178,262 | B2 | 2/2007 | Staples | 7,909,895 B2 * | 3/2011 | Dickinson et al. .............. 44/307 |
| 7,179,642 | B2 | 2/2007 | Dvorak | 2001/0023576 A1 | 9/2001 | Rollins, III |
| 7,183,328 | B2 | 2/2007 | Hershkowitz et al. | 2001/0047040 A1 | 11/2001 | Agee et al. |
| 7,189,270 | B2 | 3/2007 | Bryan et al. | 2002/0046474 A1 * | 4/2002 | Novak et al. ..................... 34/259 |
| 7,208,530 | B2 | 4/2007 | Norbeck et al. | 2002/0046561 A1 | 4/2002 | Bronicki et al. |
| 7,219,734 | B2 | 5/2007 | Bai et al. | 2002/0047058 A1 | 4/2002 | Verhoff et al. |
| 7,232,672 | B2 | 6/2007 | Weiner et al. | 2002/0062496 A1 | 5/2002 | Chapple et al. |
| 7,232,937 | B2 | 6/2007 | Bushuev | 2002/0098394 A1 | 7/2002 | Keefer et al. |
| 7,255,956 | B2 | 8/2007 | McElroy et al. | 2002/0114866 A1 | 8/2002 | Kartchner |
| 7,266,940 | B2 | 9/2007 | Balan et al. | 2002/0115731 A1 | 8/2002 | Price |
| 7,272,934 | B2 | 9/2007 | Chandran et al. | 2002/0120017 A1 | 8/2002 | Bohn et al. |
| 7,279,611 | B2 | 10/2007 | Alerasool et al. | 2002/0121092 A1 | 9/2002 | Allam et al. |
| 7,279,655 | B2 | 10/2007 | Blutke et al. | 2002/0122850 A1 | 9/2002 | Kartchner |
| 7,282,189 | B2 | 10/2007 | Zauderer | 2002/0124996 A1 | 9/2002 | Jukkola et al. |
| 7,285,350 | B2 | 10/2007 | Keefer et al. | 2002/0142208 A1 * | 10/2002 | Keefer et al. .................... 429/34 |
| 7,318,315 | B2 | 1/2008 | Stewart | 2002/0162332 A1 | 11/2002 | Hazlebeck |
| 7,329,489 | B2 | 2/2008 | Kaddurah-Daouk et al. | 2002/0165206 A1 | 11/2002 | Koyama et al. |
| 7,334,345 | B2 | 2/2008 | Lasonde | 2002/0166323 A1 | 11/2002 | Marin et al. |
| 7,354,562 | B2 | 4/2008 | Ying et al. | 2002/0179493 A1 | 12/2002 | Etter |
| 7,360,588 | B2 | 4/2008 | Vinegar et al. | 2003/0005634 A1 * | 1/2003 | Calderon et al. ................ 48/210 |
| 7,374,742 | B2 | 5/2008 | Geosits et al. | 2003/0012997 A1 | 1/2003 | Hsu |
| 7,375,142 | B2 | 5/2008 | Pearson | 2003/0024165 A1 | 2/2003 | Antal, Jr. |
| 7,381,383 | B1 | 6/2008 | Yokoyama et al. | 2003/0024806 A1 | 2/2003 | Foret |
| 7,381,550 | B2 | 6/2008 | Hallberg et al. | 2003/0038078 A1 | 2/2003 | Stamper et al. |
| RE40,419 | E | 7/2008 | Norbeck et al. | 2003/0041518 A1 * | 3/2003 | Wallace et al. .............. 48/197 R |
| 7,395,670 | B1 | 7/2008 | Drnevich et al. | 2003/0062270 A1 | 4/2003 | McAlister |
| 7,404,891 | B2 | 7/2008 | van Egmond et al. | 2003/0083391 A1 | 5/2003 | Jahnke et al. |
| 7,407,121 | B2 | 8/2008 | Kerns et al. | 2003/0089151 A1 | 5/2003 | Logan et al. |
| 7,422,624 | B2 | 9/2008 | Åsen et al. | 2003/0098227 A1 | 5/2003 | Okamoto et al. |
| 7,431,821 | B2 | 10/2008 | O'Rear et al. | 2003/0103958 A1 | 6/2003 | Short et al. |
| 7,432,098 | B2 | 10/2008 | Short et al. | 2003/0110693 A1 | 6/2003 | Drnevich et al. |
| 7,435,037 | B2 | 10/2008 | McKinzie, II | 2003/0110892 A1 | 6/2003 | Nicoloau |
| 7,451,591 | B2 | 11/2008 | Wakefield et al. | 2003/0111410 A1 | 6/2003 | Branson |
| 7,452,392 | B2 | 11/2008 | Nick et al. | 2003/0136165 A1 | 7/2003 | Logan et al. |
| 7,487,601 | B2 | 2/2009 | Carin et al. | 2003/0148443 A1 | 8/2003 | Zhao et al. |
| 7,491,444 | B2 | 2/2009 | Smith et al. | 2003/0148490 A1 | 8/2003 | Zhao et al. |
| 7,500,528 | B2 | 3/2009 | McKinzie, II et al. | 2003/0150215 A1 | 8/2003 | Rollins, III |
| 7,500,997 | B2 | 3/2009 | Norbeck et al. | 2003/0162846 A1 | 8/2003 | Wang et al. |
| 7,504,120 | B2 | 3/2009 | Steer et al. | 2003/0175411 A1 | 9/2003 | Kodas et al. |
| 7,524,528 | B2 | 4/2009 | Kodas et al. | 2003/0180742 A1 | 9/2003 | Weiner et al. |
| 7,527,094 | B2 | 5/2009 | McKinzie et al. | 2003/0181314 A1 * | 9/2003 | Kranz ............................ 502/34 |
| 7,537,803 | B2 | 5/2009 | Wang et al. | 2004/0005633 A1 | 1/2004 | Vandekerckhove et al. |
| 7,540,888 | B2 | 6/2009 | Ryder et al. | 2004/0011057 A1 | 1/2004 | Huber |
| 7,546,873 | B2 | 6/2009 | Kim et al. | 2004/0018607 A1 | 1/2004 | Callen et al. |
| 7,547,390 | B2 | 6/2009 | McCorkle | 2004/0025715 A1 | 2/2004 | Bonde et al. |
| 7,547,534 | B2 | 6/2009 | Steer et al. | 2004/0031256 A1 | 2/2004 | Rollins, III |
| 7,549,470 | B2 | 6/2009 | Vinegar et al. | 2004/0040174 A1 | 3/2004 | Childs |
| 7,550,258 | B2 | 6/2009 | Kaddurah-Daouk et al. | 2004/0045682 A1 | 3/2004 | Liprie |
| 7,550,260 | B2 | 6/2009 | Kaddurah-Daouk et al. | 2004/0050069 A1 | 3/2004 | Willems et al. |
| 7,553,463 | B2 | 6/2009 | Zauderer | 2004/0055517 A1 | 3/2004 | Nunemacher |
| 7,553,568 | B2 | 6/2009 | Keefer | 2004/0055716 A1 | 3/2004 | Landalv et al. |
| 7,553,616 | B2 | 6/2009 | Kaddurah-Daouk et al. | 2004/0060277 A1 | 4/2004 | Hatamiya et al. |
| 7,556,095 | B2 | 7/2009 | Vinegar | 2004/0079087 A1 | 4/2004 | Chandran et al. |
| 7,556,096 | B2 | 7/2009 | Vinegar et al. | 2004/0081614 A1 | 4/2004 | Ying et al. |
| 7,559,367 | B2 | 7/2009 | Vinegar et al. | 2004/0087011 A1 | 5/2004 | Dvorak |
| 7,559,368 | B2 | 7/2009 | Vinegar et al. | 2004/0103068 A1 | 5/2004 | Eker et al. |
| 7,560,126 | B2 | 7/2009 | Callen et al. | 2004/0131912 A1 | 7/2004 | Keefer et al. |
| 7,562,706 | B2 | 7/2009 | Li et al. | 2004/0140095 A1 | 7/2004 | Vinegar et al. |
| 7,575,052 | B2 | 8/2009 | Sandberg et al. | 2004/0140096 A1 | 7/2004 | Sandberg et al. |
| 7,575,053 | B2 | 8/2009 | Vinegar et al. | 2004/0144540 A1 | 7/2004 | Sandberg et al. |
| 7,581,589 | B2 | 9/2009 | Roes et al. | 2004/0144541 A1 | 7/2004 | Picha et al. |
| 7,584,789 | B2 | 9/2009 | Mo et al. | 2004/0145969 A1 | 7/2004 | Bai et al. |
| 7,589,243 | B1 | 9/2009 | Ryder | 2004/0146288 A1 | 7/2004 | Vinegar et al. |
| 7,591,310 | B2 | 9/2009 | Minderhoud et al. | 2004/0149626 A1 | 8/2004 | O'Rear et al. |
| 7,592,434 | B2 | 9/2009 | Kerovuo et al. | 2004/0152793 A1 | 8/2004 | O'Rear et al. |

| | | |
|---|---|---|
| 2004/0152933 A1 | 8/2004 | O'Rear et al. |
| 2004/0154184 A1 | 8/2004 | Bloemendaal |
| 2004/0170210 A1 | 9/2004 | Do et al. |
| 2004/0177966 A1 | 9/2004 | Vinegar et al. |
| 2004/0178052 A1 | 9/2004 | Antal, Jr. |
| 2004/0182000 A1 | 9/2004 | Mansour et al. |
| 2004/0194337 A1 | 10/2004 | Gasparini et al. |
| 2004/0211569 A1 | 10/2004 | Vinegar et al. |
| 2004/0224926 A1 | 11/2004 | Koyama et al. |
| 2004/0238596 A1 | 12/2004 | Ellison et al. |
| 2004/0251241 A1* | 12/2004 | Blutke et al. ............. 219/121.59 |
| 2004/0261285 A1 | 12/2004 | Harada |
| 2005/0006097 A1 | 1/2005 | Sandberg et al. |
| 2005/0009175 A1 | 1/2005 | Bergh et al. |
| 2005/0027148 A1* | 2/2005 | Connor ........................... 585/14 |
| 2005/0032920 A1 | 2/2005 | Norbeck et al. |
| 2005/0051327 A1 | 3/2005 | Vinegar et al. |
| 2005/0072343 A1 | 4/2005 | Fung et al. |
| 2005/0084980 A1 | 4/2005 | Koo et al. |
| 2005/0110990 A1 | 5/2005 | Koo et al. |
| 2005/0113467 A1 | 5/2005 | Branson |
| 2005/0120715 A1 | 6/2005 | Labrador |
| 2005/0124010 A1 | 6/2005 | Short et al. |
| 2005/0135983 A1 | 6/2005 | Geosits et al. |
| 2005/0144961 A1 | 7/2005 | Colibaba-Evulet et al. |
| 2005/0150230 A1 | 7/2005 | Rollins, III |
| 2005/0153410 A1 | 7/2005 | Hallberg et al. |
| 2005/0176000 A1 | 8/2005 | Callen et al. |
| 2005/0191491 A1 | 9/2005 | Wang et al. |
| 2005/0196823 A1 | 9/2005 | Vandekerckhove et al. |
| 2005/0217134 A1 | 10/2005 | Lasonde |
| 2005/0220695 A1* | 10/2005 | Abatzoglou et al. ...... 423/445 R |
| 2005/0238548 A1 | 10/2005 | van Egmond et al. |
| 2005/0239054 A1 | 10/2005 | Arimilli et al. |
| 2005/0246780 A1 | 11/2005 | Short et al. |
| 2005/0256212 A1 | 11/2005 | Norbeck et al. |
| 2006/0003433 A1 | 1/2006 | Steer et al. |
| 2006/0010708 A1 | 1/2006 | Carin et al. |
| 2006/0010712 A1 | 1/2006 | Carin et al. |
| 2006/0010714 A1 | 1/2006 | Carin et al. |
| 2006/0024328 A1 | 2/2006 | Pasco et al. |
| 2006/0032788 A1 | 2/2006 | Etter |
| 2006/0053791 A1* | 3/2006 | Prentice ........................... 60/645 |
| 2006/0096163 A1 | 5/2006 | Dickinson et al. |
| 2006/0096298 A1 | 5/2006 | Barnicki et al. |
| 2006/0101665 A1 | 5/2006 | Carin et al. |
| 2006/0101881 A1 | 5/2006 | Carin et al. |
| 2006/0112639 A1 | 6/2006 | Nick et al. |
| 2006/0123657 A1 | 6/2006 | Tada et al. |
| 2006/0128818 A1 | 6/2006 | Wang et al. |
| 2006/0130546 A1 | 6/2006 | Beaton et al. |
| 2006/0154126 A1 | 7/2006 | Ritts et al. |
| 2006/0186234 A1 | 8/2006 | Kerns et al. |
| 2006/0201024 A1 | 9/2006 | Carin et al. |
| 2006/0210971 A1 | 9/2006 | Kerovuo et al. |
| 2006/0211777 A1 | 9/2006 | Severinsky |
| 2006/0218905 A1 | 10/2006 | Alexander |
| 2006/0223154 A1 | 10/2006 | Kohr |
| 2006/0240369 A1 | 10/2006 | Duesel, Jr. et al. |
| 2006/0254079 A1 | 11/2006 | Carin et al. |
| 2006/0254080 A1 | 11/2006 | Carin et al. |
| 2006/0254081 A1 | 11/2006 | Carin et al. |
| 2006/0260190 A1 | 11/2006 | Miyoshi et al. |
| 2006/0265954 A1 | 11/2006 | Dogru et al. |
| 2006/0294620 A1 | 12/2006 | Gray et al. |
| 2007/0006592 A1 | 1/2007 | Balan et al. |
| 2007/0007198 A1 | 1/2007 | Balvanz |
| 2007/0012045 A1 | 1/2007 | Chandran et al. |
| 2007/0039324 A1 | 2/2007 | Inui et al. |
| 2007/0045265 A1 | 3/2007 | McKinzie, II |
| 2007/0045266 A1 | 3/2007 | Sandberg et al. |
| 2007/0045267 A1 | 3/2007 | Vinegar et al. |
| 2007/0045268 A1 | 3/2007 | Vinegar et al. |
| 2007/0056053 A1 | 3/2007 | Gray et al. |
| 2007/0066654 A1 | 3/2007 | Koyama et al. |
| 2007/0084077 A1 | 4/2007 | Gorbell et al. |
| 2007/0095046 A1 | 5/2007 | Wallace |
| 2007/0095536 A1 | 5/2007 | Vinegar et al. |
| 2007/0095537 A1 | 5/2007 | Vinegar |
| 2007/0101732 A1 | 5/2007 | Mak |
| 2007/0105112 A1 | 5/2007 | Hitchman et al. |
| 2007/0108068 A1 | 5/2007 | Suh et al. |
| 2007/0108200 A1 | 5/2007 | McKinzie, II et al. |
| 2007/0108201 A1 | 5/2007 | Vinegar et al. |
| 2007/0114173 A1 | 5/2007 | Dvorak |
| 2007/0119098 A1 | 5/2007 | Diaz et al. |
| 2007/0125533 A1 | 6/2007 | Minderhoud et al. |
| 2007/0127897 A1 | 6/2007 | John et al. |
| 2007/0131411 A1 | 6/2007 | Vinegar et al. |
| 2007/0131415 A1 | 6/2007 | Vinegar et al. |
| 2007/0131419 A1 | 6/2007 | Maria Roes et al. |
| 2007/0131420 A1 | 6/2007 | Mo et al. |
| 2007/0131427 A1 | 6/2007 | Li et al. |
| 2007/0131428 A1 | 6/2007 | Willem Cornelis den Boestert et al. |
| 2007/0133959 A1 | 6/2007 | Vinegar et al. |
| 2007/0133960 A1 | 6/2007 | Vinegar et al. |
| 2007/0133961 A1 | 6/2007 | Fairbanks et al. |
| 2007/0137856 A1 | 6/2007 | McKinzie et al. |
| 2007/0137857 A1 | 6/2007 | Vinegar et al. |
| 2007/0144732 A1 | 6/2007 | Kim et al. |
| 2007/0157329 A1 | 7/2007 | Callen et al. |
| 2007/0163142 A1 | 7/2007 | Carin et al. |
| 2007/0163316 A1 | 7/2007 | Fedkenheuer et al. |
| 2007/0166541 A1 | 7/2007 | Smith et al. |
| 2007/0170071 A1 | 7/2007 | Suh et al. |
| 2007/0202318 A1 | 8/2007 | Smith et al. |
| 2007/0202566 A1 | 8/2007 | Bornscheuer et al. |
| 2007/0204623 A1 | 9/2007 | Rollins, III |
| 2007/0207186 A1 | 9/2007 | Scanlon et al. |
| 2007/0220873 A1 | 9/2007 | Bosteels |
| 2007/0221377 A1 | 9/2007 | Vinegar et al. |
| 2007/0227069 A1 | 10/2007 | Norbeck et al. |
| 2007/0227351 A1 | 10/2007 | Garcia-Martinez |
| 2007/0231820 A1 | 10/2007 | Weiner et al. |
| 2007/0253874 A1 | 11/2007 | Foret |
| 2007/0253886 A1* | 11/2007 | Abatzoglou et al. ...... 423/445 R |
| 2007/0258869 A1 | 11/2007 | Tsangaris et al. |
| 2007/0266634 A1 | 11/2007 | Tsangaris et al. |
| 2007/0284453 A1 | 12/2007 | Tsangaris et al. |
| 2007/0289216 A1 | 12/2007 | Tsangaris et al. |
| 2007/0293693 A1 | 12/2007 | Krusic et al. |
| 2008/0000100 A1 | 1/2008 | Staples |
| 2008/0000215 A1* | 1/2008 | Duncan .......................... 60/204 |
| 2008/0017370 A1 | 1/2008 | Vinegar et al. |
| 2008/0020435 A1 | 1/2008 | Burke et al. |
| 2008/0028631 A1* | 2/2008 | Leahy .............................. 34/82 |
| 2008/0028634 A1 | 2/2008 | Leahy |
| 2008/0041829 A1* | 2/2008 | Blutke et al. ............. 219/121.36 |
| 2008/0050800 A1 | 2/2008 | McKeeman et al. |
| 2008/0052789 A1 | 2/2008 | Jorgensen et al. |
| 2008/0090113 A1 | 4/2008 | Keefer et al. |
| 2008/0104858 A1 | 5/2008 | Carin et al. |
| 2008/0104887 A1 | 5/2008 | Tsangaris et al. |
| 2008/0105019 A1 | 5/2008 | Carin et al. |
| 2008/0107577 A1 | 5/2008 | Vinegar et al. |
| 2008/0110043 A1 | 5/2008 | Carin et al. |
| 2008/0134540 A1 | 6/2008 | Lasonde |
| 2008/0135245 A1 | 6/2008 | Smith et al. |
| 2008/0141643 A1 | 6/2008 | Varatharajan et al. |
| 2008/0147241 A1 | 6/2008 | Tsangaris et al. |
| 2008/0152782 A1 | 6/2008 | Avgoustopoulos et al. |
| 2008/0153145 A1 | 6/2008 | Harper |
| 2008/0155984 A1 | 7/2008 | Liu et al. |
| 2008/0155985 A1 | 7/2008 | Labrador |
| 2008/0161428 A1 | 7/2008 | Strait |
| 2008/0164443 A1 | 7/2008 | White et al. |
| 2008/0167436 A1 | 7/2008 | Schilling et al. |
| 2008/0172899 A1 | 7/2008 | Carin et al. |
| 2008/0184709 A1* | 8/2008 | Rowell ............................ 60/776 |
| 2008/0189979 A1 | 8/2008 | Carin et al. |
| 2008/0200558 A1 | 8/2008 | Koyama et al. |
| 2008/0202028 A1 | 8/2008 | Tsangaris et al. |
| 2008/0209807 A1 | 9/2008 | Tsangaris et al. |
| 2008/0210089 A1* | 9/2008 | Tsangaris et al. ................. 95/90 |
| 2008/0217321 A1 | 9/2008 | Vinegar et al. |
| 2008/0221772 A1 | 9/2008 | Carin et al. |
| 2008/0222956 A1 | 9/2008 | Tsangaris et al. |

| | | | | |
|---|---|---|---|---|
| 2008/0233175 A1 | 9/2008 | Steer et al. | | |
| 2008/0245906 A1 | 10/2008 | Kerns et al. | | |
| 2008/0248160 A1 | 10/2008 | Steer et al. | | |
| 2008/0261321 A1 | 10/2008 | Patton et al. | | |
| 2008/0289788 A1 | 11/2008 | Pinkham, Jr. et al. | | |
| 2008/0305531 A1 | 12/2008 | Lam et al. | | |
| 2008/0309087 A1 | 12/2008 | Evulet et al. | | |
| 2008/0319093 A1* | 12/2008 | Olah et al. | 518/700 | |
| 2009/0000184 A1 | 1/2009 | Garwood | | |
| 2009/0007484 A1 | 1/2009 | Smith | | |
| 2009/0020089 A1 | 1/2009 | Ryder et al. | | |
| 2009/0020090 A1 | 1/2009 | Ryder et al. | | |
| 2009/0020456 A1 | 1/2009 | Tsangaris et al. | | |
| 2009/0028767 A1 | 1/2009 | Parker et al. | | |
| 2009/0038023 A1 | 2/2009 | Weiner et al. | | |
| 2009/0038797 A1 | 2/2009 | Skala et al. | | |
| 2009/0062139 A1 | 3/2009 | Short et al. | | |
| 2009/0070899 A1 | 3/2009 | Apuya et al. | | |
| 2009/0071647 A1 | 3/2009 | Vinegar et al. | | |
| 2009/0084707 A1* | 4/2009 | Gil | 208/106 | |
| 2009/0113895 A1* | 5/2009 | Steele et al. | 60/780 | |
| 2009/0117024 A1* | 5/2009 | Weedon et al. | 423/437.1 | |
| 2009/0119990 A1 | 5/2009 | Johnson et al. | | |
| 2009/0119991 A1 | 5/2009 | Johnson et al. | | |
| 2009/0119992 A1 | 5/2009 | Johnson et al. | | |
| 2009/0119994 A1 | 5/2009 | Johnson et al. | | |
| 2009/0126270 A1 | 5/2009 | Johnson et al. | | |
| 2009/0126276 A1 | 5/2009 | Johnson et al. | | |
| 2009/0130128 A1 | 5/2009 | Alberte et al. | | |
| 2009/0137433 A1 | 5/2009 | Smith et al. | | |
| 2009/0139134 A1 | 6/2009 | Yoshikuni et al. | | |
| 2009/0149530 A1 | 6/2009 | Alberte et al. | | |
| 2009/0152208 A1 | 6/2009 | Agrawal | | |
| 2009/0152209 A1 | 6/2009 | Agrawal | | |
| 2009/0155238 A1 | 6/2009 | Weiner et al. | | |
| 2009/0155873 A1 | 6/2009 | Kashiyama et al. | | |
| 2009/0158739 A1* | 6/2009 | Messmer | 60/648 | |
| 2009/0163753 A1 | 6/2009 | Roth et al. | | |
| 2009/0183424 A1 | 7/2009 | Gorbell et al. | | |
| 2009/0183430 A1 | 7/2009 | Schubert et al. | | |
| 2009/0188127 A1 | 7/2009 | Gorbell et al. | | |
| 2009/0188165 A1 | 7/2009 | Ariyapadi et al. | | |
| 2009/0188290 A1 | 7/2009 | Marler | | |
| 2009/0200176 A1 | 8/2009 | McCutchen et al. | | |
| 2009/0203519 A1* | 8/2009 | Abatzoglou et al. | 502/177 | |
| 2009/0217584 A1 | 9/2009 | Raman et al. | | |
| 2009/0217585 A1 | 9/2009 | Raman et al. | | |
| 2009/0217588 A1 | 9/2009 | Hippo et al. | | |
| 2009/0220480 A1 | 9/2009 | Gray et al. | | |
| 2009/0221051 A1 | 9/2009 | Steer et al. | | |
| 2009/0221721 A1 | 9/2009 | Norbeck et al. | | |
| 2009/0227003 A1 | 9/2009 | Blotsky et al. | | |
| 2009/0255144 A1 | 10/2009 | Gorbell et al. | | |
| 2009/0261017 A1 | 10/2009 | Iqbal et al. | | |
| 2009/0305355 A1 | 12/2009 | Henriksen et al. | | |
| 2009/0320492 A1 | 12/2009 | Carin et al. | | |
| 2010/0022666 A1* | 1/2010 | Boshoff et al. | 518/702 | |
| 2010/0024282 A1* | 2/2010 | Joseph et al. | 44/280 | |
| 2010/0083666 A1* | 4/2010 | Brook et al. | 60/780 | |
| 2010/0126180 A1* | 5/2010 | Forsyth et al. | 60/780 | |
| 2010/0135851 A1* | 6/2010 | Michalek et al. | 422/26 | |
| 2010/0139116 A1* | 6/2010 | Carin et al. | 34/516 | |
| 2010/0156104 A1* | 6/2010 | Bottinelli | 290/52 | |
| 2010/0170263 A1* | 7/2010 | Steele et al. | 60/781 | |
| 2010/0172819 A1* | 7/2010 | Wallace et al. | 423/471 | |
| 2010/0175379 A1* | 7/2010 | Liu et al. | 60/723 | |
| 2010/0275781 A1* | 11/2010 | Tsangaris et al. | 96/108 | |
| 2010/0300112 A1* | 12/2010 | Hannemann et al. | 60/781 | |
| 2010/0313442 A1* | 12/2010 | Russell et al. | 34/468 | |
| 2011/0061298 A1* | 3/2011 | Frey et al. | 48/78 | |
| 2011/0067410 A1* | 3/2011 | Zubrin et al. | 60/780 | |
| 2011/0070135 A1* | 3/2011 | Balmas et al. | 423/220 | |
| 2011/0088406 A1* | 4/2011 | Gorell et al. | 60/783 | |

FOREIGN PATENT DOCUMENTS

| | | | |
|---|---|---|---|
| CN | 1035488 A | | 9/1989 |
| DE | 43 31 932 A1 | | 3/1994 |
| DE | 4331932 A1 | * | 3/1994 |
| EP | 0 428 015 B1 | | 5/1991 |
| EP | 0 298 941 B1 | | 3/1992 |
| EP | 0 677 237 B1 | | 3/1997 |
| EP | 781960 A2 | * | 7/1997 |
| EP | 1217059 A1 | * | 6/2002 |
| EP | 2233433 A1 | * | 9/2010 |
| GB | 2 335 188 A | | 9/1999 |
| JP | 55127197 A | * | 10/1980 |
| JP | 55142576 A | * | 11/1980 |
| JP | 56108023 A | * | 8/1981 |
| JP | 57071393 A | * | 5/1982 |
| JP | 62160200 A | * | 7/1987 |
| JP | 62163732 A | * | 7/1987 |
| JP | 01300021 A | * | 12/1989 |
| JP | 06285486 A | * | 10/1994 |
| JP | 07158831 A | * | 6/1995 |
| JP | 2000140897 A | * | 5/2000 |
| JP | 2000280000 A | * | 10/2000 |
| JP | 2000282071 A | * | 10/2000 |
| JP | 2001300595 A | * | 10/2001 |
| JP | 2001-340828 | | 12/2001 |
| JP | 2002276387 A | * | 9/2002 |
| JP | 2007002825 A | * | 1/2007 |
| JP | 2007021333 A | * | 2/2007 |
| WO | WO 95/29884 | | 11/1995 |
| WO | WO 9624759 A1 | * | 8/1996 |
| WO | WO 01/40644 A1 | | 6/2001 |
| WO | WO 02/42611 A1 | | 5/2002 |

OTHER PUBLICATIONS

Combined Heat and Power Quality Assurance Programme: Guidance Note 11 (2003); Guidance Note 12 (2003); Guidance Note 16 (2004); Appendix 3 (2000), www.chpga.com.

Ernest et al., "Waste Heat Utilization for Dewatering Sewage Sludge," *Waste Heat Management and Utilization*, vol. 3, Edited by Lee et al., pp. 2443-2463 (1979).

Fairfield, D, "Pelleting Cost Center," In: R. R. McEllhiney (Ed.) Feed Manufacturing Technology IV, pp. 111-130, Am. Feed Ind. Assoc., Inc., Arlington, VA (1994).

How Milorganite is Made, 1 page (Aug. 4, 2004).

Leaver, R., "The Pelleting Process," Andritz Sprout, a Division of Andritz Inc., Muncy, Pennsylvania, pp. 1-49 (Undated).

Material Safety Data Sheet Milorganite® 5-2-0 Organic Nitrogen Fertilizer, pp. 1-4 (Sep. 13, 2007).

Material Safety Data Sheet Milorganite® 6-2-0 Fertilizer, pp. 1-4 (Oct. 30, 2001).

Material Safety Data Sheet Milorganite® 6-2-0 Fertilizer, pp. 1-4 (May 29, 2007).

Material Safety Data Sheet Milorganite® GardenCare 6-2-0 Fertilizer, pp. 1-4 (May 29, 2007).

Milwaukee home of Milorganite, http://www.retrocom.com/retromilw/milorg.htm, 3 pages (Date Printed Mar. 17, 2008).

Milorganite Our History, http://www.milorganite.com/about/history.cfm, 2 pages (Copyright 2008).

Milorganite—Wikipedia, the free encyclopedia, http://en.wikipedia.org/wiki/Milorganite, 1 page (Mar. 1, 2008).

Miscellaneous pages from Duske Engineering.com, http://www.duskeengineering.com, 11 pp., (Jun. 2004).

Partanen, William, E., P.E., "VOC Destruction Using Combustion Turbines," pp. 1-9, Neill and Gunter (Sep. 2002).

Partanen, William E., P.E., "Amani VOC/HAP's Mitigation System an Innovative Method of Destroying VOC/HAP's That Provides an Attractive Return on Investment," pp. 1-12, Neill and Gunter (Jan. 2004).

Perdue AgriRecycle, LLC, Process, www.perdueagrirecycle.com/process.html (2006/2001).

Scott A.S.T. Drying System, Scott Equipment Company, 6 pages (Publicly known at least as early as Feb. 13, 1995).

Transcript of audio track of DVD: "Legal Alfalfa Presents—Alfalfa the Remarkable Product," from Legal Alfalfa Products Ltd., Legal, Alberta, Canada (circ. 2004), www.alfatec.ca.

* cited by examiner

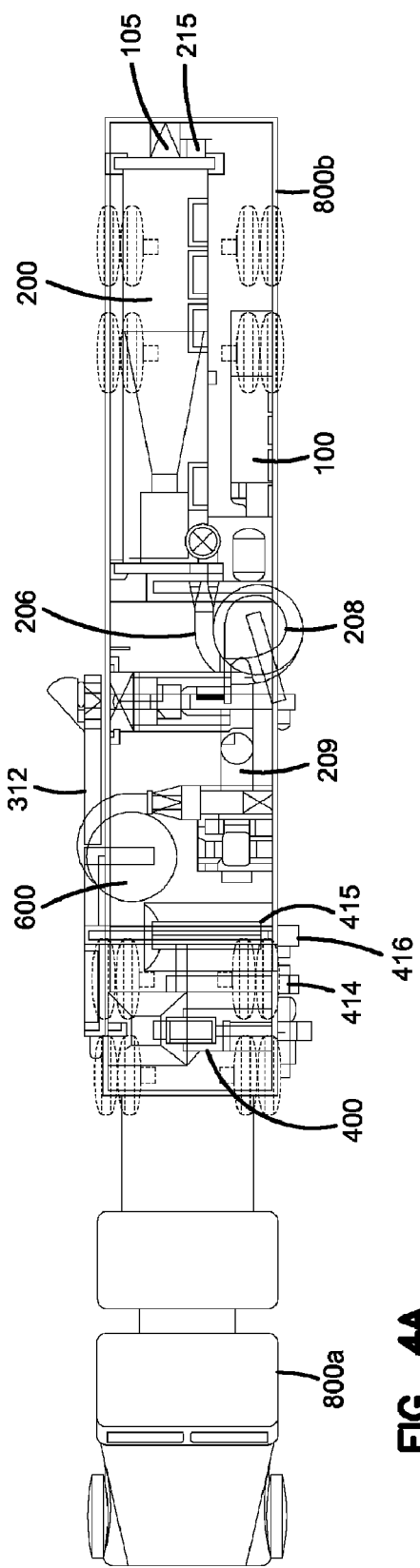
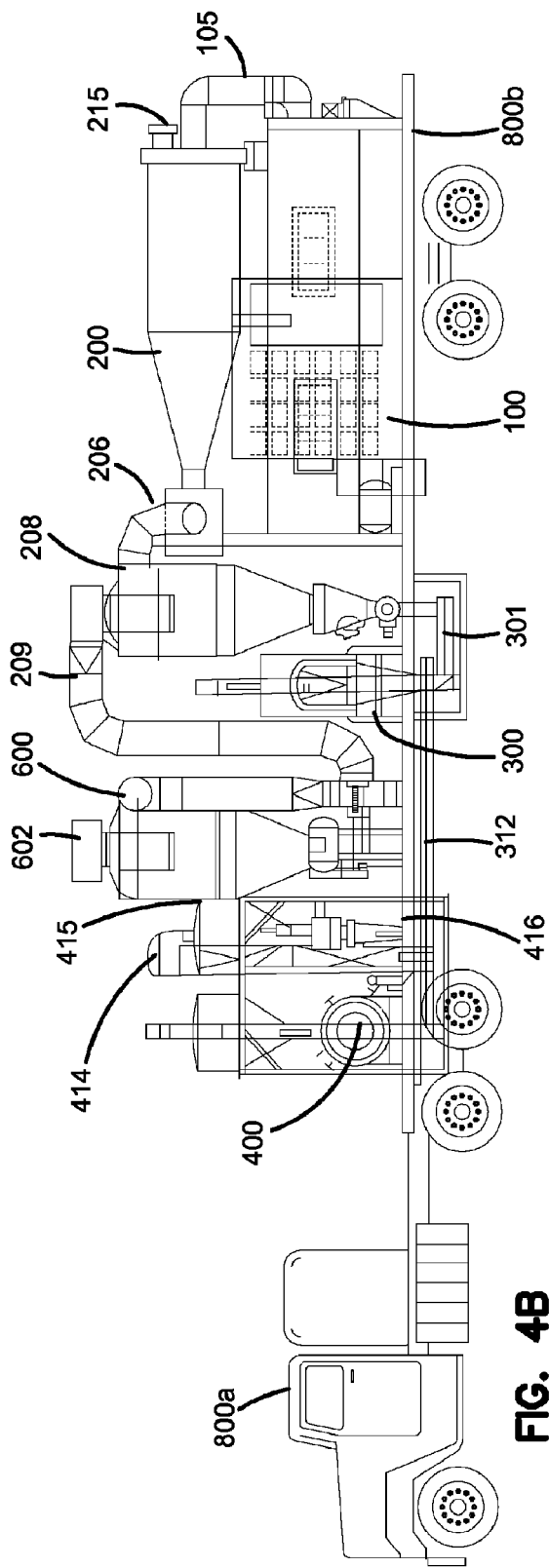

SYSTEMS FOR PREVENTION OF HAP EMISSIONS AND FOR EFFICIENT DRYING/DEHYDRATION PROCESSES

CROSS REFERENCE TO RELATED APPLICATION

This application is a divisional of application Ser. No. 11/335,153, filed Jan. 18, 2006, which application is incorporated herein by reference in its entirety.

FIELD OF THE INVENTION

This invention relates to processes, systems and equipment for economically removing water from raw materials or intermediate materials in manufacturing processes and/or for economically controlling or preventing HAP, including VOC, emissions in industrial processes and operating plants.

BACKGROUND OF THE INVENTION

Industrial processing facilities for food, paper, drug and other manufacturing that involve the use of and removal of large amounts of water have a continuing need for more efficient and more economical equipment and processes for removal of water from raw material streams and/or intermediate product streams. Rising fuel costs always bring more urgency to the need for more efficient and lower cost water removal and dehydration technologies.

Industrial manufacturing and processing facilities that produce hazardous air pollutant (HAP), including volatile organic compound (VOC), emissions have a continuing need for more effective and more economical equipment and processes for control and prevention of such emissions into the atmosphere. Increasing regulatory pressure from federal, state and provincial Environmental Protection Agencies (EPAs) on industrial operations to eliminate or reduce HAP emission is resulting in more urgency for improved and more economical HAP emission control technologies.

Prior art systems have not satisfactorily addressed the problem of HAP emissions produced in industrial manufacturing operations. Sources of such emissions are the manufacturing processes themselves and the materials produced in the manufacturing processes. Some of these emissions are passed through scrubbers or converters to contain or alter the HAP content, but some are typically and frequently vented or released to the atmosphere, and are environmentally objectionable due to the atmospheric pollution caused by the VOCs, greenhouse gases and other components contained therein.

Examples of the prior art publications that have addressed the above problems include U.S. Pat. Nos. 5,866,752 to Goozner, and 6,944,967 to Staples, the disclosures of which are incorporated herein by reference in their entirety.

It is apparent from the above that there is a substantial unmet need for environmentally and economically acceptable technologies for control and prevention of HAP emissions and for economical removal of water from high water content process streams. The present invention is directed to methods, apparatus, systems and products for meeting some or all of these needs.

SUMMARY OF THE INVENTION

The present invention provides economical and simplified methods, systems and apparatus for controlling and containing HAP emissions, including VOC emissions from various industrial operations.

In one aspect, this invention provides a method for controlling HAP emissions from a manufacturing facility comprising passing the HAP emission into the combustion air intake of a gas turbine, which is preferably a gas turbine generator.

In another aspect, this invention provides apparatus for controlling HAP emissions from a manufacturing facility comprising a gas turbine, preferably a gas turbine generator, and a connection between the HAP emitting equipment and the gas turbine that directs at least a portion, and preferably all, of the HAP emissions into the combustion air intake of the gas turbine.

In another aspect, this invention provides a method of modifying an existing manufacturing facility containing a gas turbine or gas turbine generator and having HAP emissions which comprises connecting the HAP emission source to the turbine combustion air intake to direct at least a portion, and preferably all, the HAP emissions into the combustion air intake of the gas turbine.

In another aspect, this invention provides economical and simplified methods, systems and apparatus for removing water, dehydrating and/or thermally converting at least one feedstock containing water, preferably at least one high water content feedstock.

In another aspect, this invention provides a method for water from a high water content feedstock comprising contacting the feedstock with the exhaust gases from a gas turbine, preferably a gas turbine generator. Preferably the contacting is under conditions of substantially excluding outside air from the contacting step to provide best economy and preclude oxidation of the feedstock materials during water removal.

In another aspect, this invention provides apparatus for drying and/or converting high water content feedstock comprising a gas turbine in combination with a dryer vessel adapted for receiving high water content feedstock and for receiving the exhaust gases from the gas turbine through a connection; wherein the connection between the gas turbine and the dryer vessel is preferably adapted to substantially preclude the introduction of air into the dryer vessel and preferably provides the dryer vessel adapted for such drying and/or converting the high water content feedstock by direct contact of the exhaust gases and the high water content feedstock.

In another aspect, this invention provides a portable system for processing high water content feedstock comprising at least one portable dryer unit adapted for drying or heat treating a high water content feedstock to produce a dried or altered material and at least one portable processing unit adapted for converting the dried or altered material from the dryer unit into a product having a form suitable for conventional handling and transport, and preferably provides such a portable system wherein the dryer unit comprises a gas turbine, preferably a gas turbine generator and a dryer vessel. Further, the invention optionally provides such a portable system wherein the gas turbine and dryer vessel are connected by an arrangement that passes the gas turbine exhaust gases into the dryer vessel and substantially precludes the introduction of air into the dryer vessel.

In another aspect, this invention provides the above portable system comprising a first skid-mounted unit comprising the gas turbine generator adapted for producing electricity; and a second skid-mounted unit comprising the dryer vessel adapted for connection to the gas turbine to receive the gas turbine exhaust gases and to preclude the introduction of air into the dryer vessel. Optionally a third skid-mounted unit is provided comprising the processing unit. Preferably the portable systems of this invention comprise rail-mounted, truck-mounted or semitrailer-mounted units. In another aspect, this invention provides the portable system, comprising the gas turbine and dryer vessel, plus an optional processing unit, configured and sized for a single skid-mount or truck-mount installation. Another optional aspect comprises an enclosure or enclosures for the portable units, primarily for operating noise attenuation as well as protection from weather conditions.

In another aspect, this invention provides a system for control and destruction of HAP emissions from industrial facilities comprising a gas turbine having a combustion air intake and a facility having an HAP emission, wherein the combustion air intake is adapted to receive at least a portion of, and preferably substantially all of, the HAP emission from the facility. The gas turbine can optionally comprise a gas turbine generator and can optionally include a dryer vessel adapted for receiving the gas turbine exhaust and for receiving and heat treating high water content feedstock. In an alternative aspect, this invention provides said systems for processing such HAP emission through the combustion air intake of a reciprocating engine, which can optionally include an electric generator and can optionally include a dryer vessel adapted for receiving the engine exhaust. In another alternative aspect the HAP emissions can be directed to the combustion air intake of gas, oil or other burners that are employed to perform the drying, dehydration and/or material conversion according to the above aspects of this invention.

In another aspect, this invention provides apparatus for treating high water content feedstock comprising a gas turbine having a combustion air intake adapted to receive HAP emission from an industrial facility producing high water content feedstock, a dryer vessel having a connection adapted for receiving exhaust gases from the gas turbine and having an inlet for receiving the high water content feedstock. Optionally the combustion air intake can be adapted for connection to the facility ventilation system whereby the combustion air intake receives substantially all the HAP emissions from the facility. Additionally in this aspect, the connection between the dryer vessel and the gas turbine exhaust can be adapted to substantially preclude the introduction of air into the dryer vessel.

The above aspects and other aspects will be apparent to one skilled in the art from the disclosure herein.

BRIEF DESCRIPTION OF THE DRAWINGS

FIG. 4A is a plan view and FIG. 4B is an elevation view of an illustration of a configuration of the system of this invention mounted on a semitrailer truck.

DESCRIPTION OF THE INVENTION

Figure 1:
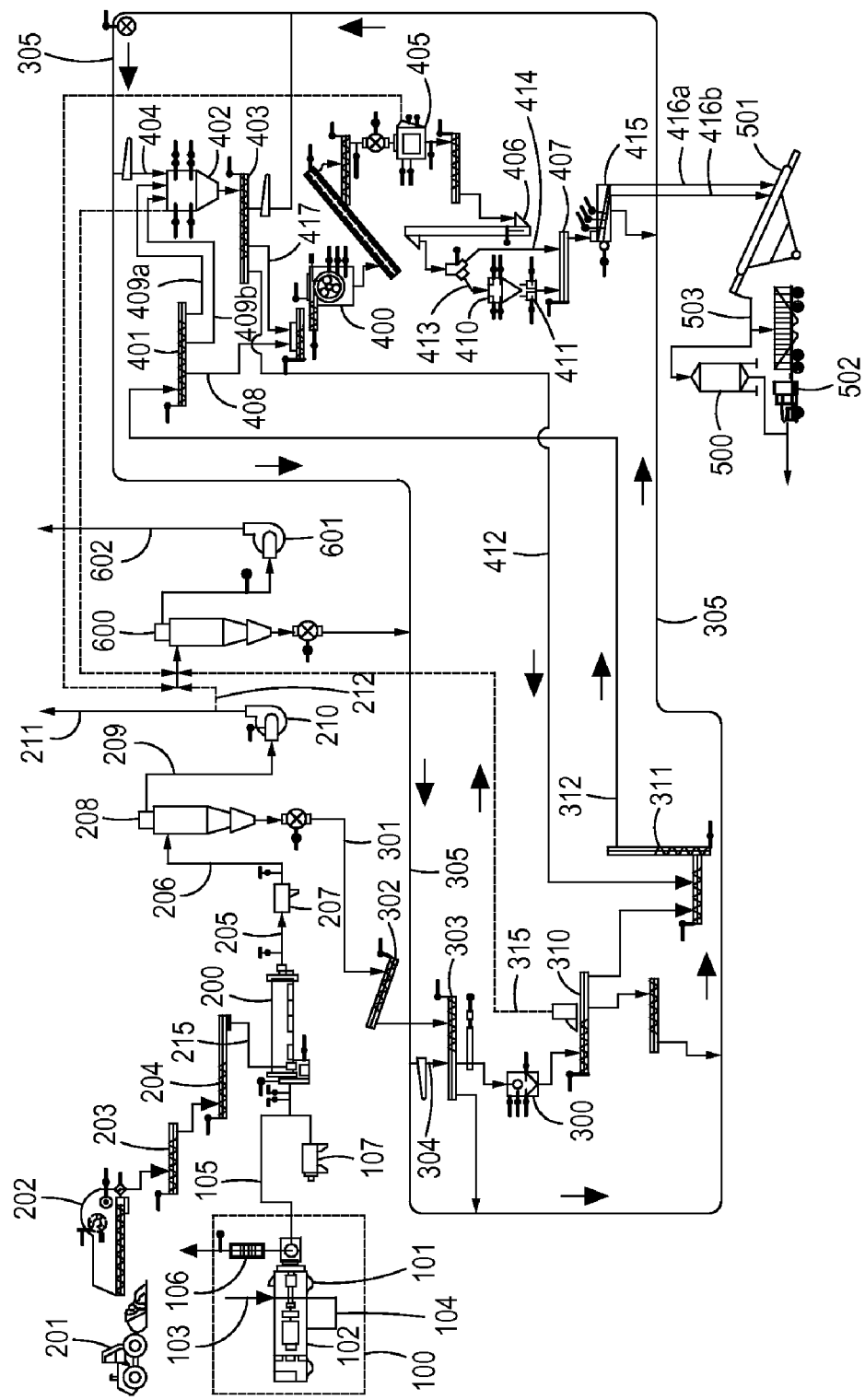
FIG. 1 is a schematic diagram of a process for treating high water content feedstock using the process and equipment in accordance with the present invention.

This invention provides an economical, efficient and simplified solution to the increasingly severe problem of environmental pollution caused by HAP emissions from industrial operations. Prior art methods and systems provided to date either are not sufficiently effective in controlling such emissions or are not adaptable to be economically feasible for small as well as large industrial operations. Other problems exist with many of the prior art systems, including uneconomical to operate, failure to decontaminate and failure to prevent air pollution (or in fact causing additional or alternative environmental problems in the operation of the process).

The present invention provides highly efficient and economical technology in the form of processes, apparatus and systems for (a) processing high water content feedstocks and for (b) reducing or eliminating the undesirable HAP emissions. The greatest efficiency and economic benefit of the present invention is achieved when the processes, apparatus and systems of this invention are employed in a single industrial facility to both process high water content feedstock and control HAP emissions, but similar benefits can be realized when the processes, apparatus and systems of this invention are used to process high water content feedstock in or for one facility and to control HAP emissions in or from a second nearby or neighboring facility. And, this invention can provide substantial benefits to a facility utilizing (a) or (b), or both.

The term "high water content feedstock" is used herein to mean and include industrial manufacturing process streams which can be raw material streams, intermediate streams or semi-finished product streams that need water removed to enable further processing or produce a final product and which may optionally comprise organic materials or which optionally comprise inorganic materials or mixtures thereof. This invention can provide efficient processes and systems for removal of water from process streams and/or provide heating to thermally convert or react a product stream to a converted or reacted product (in batch or continuous operations). Uses of this invention include removing water from, drying and treating continuous process streams and/or batches in paper manufacturing, manufacture of particle board, cardboard, drywall board, green board, etc., potato processing, human food production, such as production of oatmeal, corn flakes, corn syrup, corn meal, corn starch, mashed potatoes, sugar, milk, powdered milk, cheese, sauces, ketchup, jams and jellies, "instant" coffee, juice concentrates, and other dehydrated products which are rehydrated at the time of use, beer and other fermented and/or distilled products, snack foods and other consumer products, such as pet food, drug, cosmetic, chemical and other manufacturing facilities. As is apparent, the systems and processes of this invention can be used to process a feedstock by dehydration without conversion or reaction, by conversion or reaction without dehydration, or by any combination or proportion of both. The systems and apparatus of this invention can also be adapted for installation at particular individual facilities to intercept the process streams for water removal. Related aspects of this invention for use in processing waste materials, manure and municipal sewage, are disclosed in commonly assigned copending U.S. patent application Ser. No. 11/184,738 and Ser. No. 11/184,739 both filed on Jul. 18, 2005, the disclosures of which are incorporated herein by reference in their entirety.

The present invention provides simplified, economically efficient processes to produce liquid, paste, slurry, or solid products that comprise the solids content of the high water content feedstocks (including intermediate process streams or intermediate products) that have been dehydrated to the desired moisture content level and/or have been converted, reacted or altered physically and/or chemically as desired. This invention also provides for recovering and recycling the water removed from the feedstock, which water can be used for process water or other industrial uses, and for recovering and recycling all solids (fines or other) produced in the process, so that there are no significant solid products produced or resulting from this invention other than the desired products suitable for commercial use. The selection and adaptation of the processes, apparatus and systems of this invention to treat or process a particular feedstock to produce a particular desired solid, liquid, paste or slurry product will be apparent to one skilled in the art from the disclosure herein.

According to this invention, a most efficient way of providing the hot gases for contact with the high water content feedstock is the exhaust from a gas turbine, and preferably a gas turbine electric generator. According to the system of this invention, the gas turbine is fueled from locally available conventional fuel sources, such as pipeline natural gas. The electricity produced from the gas turbine generator is preferably used internally in the manufacturing facility or in other nearby operations as a source of power or in a combination of uses for power and heat recovery from the processes employed in this invention, or can be sold into the local power grid as a revenue source.

A preferred feature of the process and apparatus of this invention is that the gas turbine and the high water content feedstock dryer vessel receiving the exhaust gas from the gas turbine are connected together such that induction of outside air into the dryer vessel is substantially or completely precluded and the dryer vessel preferably receives the exhaust gases directly from the gas turbine. It is preferred that 100% of the gas turbine exhaust gases are passed into the dryer vessel and, for most efficient operation, preferably without passing through any intervening heat exchanger, silencer or other equipment in order that the dryer vessel receives the maximum heating from the gas turbine exhaust. It is also recognized that excess exhaust gases from the turbine not needed for the dryer vessel operation can be diverted to provide heat required in other aspects of the manufacturing facility or in other nearby operations. It is also preferred that the exhaust gases result from conventional and efficient combustion ratios in the gas turbine so that the exhaust gases contain minimum or limited amount of free oxygen, essentially no unburned fuel, no exposed flame and that the optimum exhaust gas temperature (EGT) is achieved, for maximum heat produced, per unit of fuel consumed. If desired, combustion can be at stoichiometric ratio for peak EGT operation at maximum temperature and maximum heat input for the process and system of this invention. The absence of excess oxygen in the exhaust gases, precluding outside air induction into the dryer vessel, the absence of exposed flame and operation at the temperatures set forth herein prevents significant oxidation of the high water content feedstock in the dryer vessel, preserves the maximum nutrient value in the high water content feedstock for containment in the end product and, when the output of the dryer vessel is a dry, oxidizable material, prevents the danger of fire damage to the equipment and provides an operation safe from flash fires in the dryer vessel. The absence of excess fuel in the exhaust gases prevents the exhaust gases from being a source of hydrocarbons that must be scrubbed from the vapor effluent from the operation of this invention before being released into the atmosphere. In other preferred operations of this invention it may be desired or essential that air or oxygen be introduced in controlled quantities or ratios to provide a desired oxidation or chemical conversion of the high water content feedstock in the dryer vessel.

For use in this invention, it is preferred that the high water content feedstock have a moisture content of at least 30% by weight water, preferably at least 50% and more preferably at least 70% in order for the economic benefit of this invention to be best utilized. However, in some operations the water content of the feedstock material may be as high as 90%, 95% or even 98%. In addition, the feedstock material may be a solution with all solids dissolved therein, where the dissolved solids are precipitated out as the water is evaporated from the feedstock in the processes and systems of this invention. The present invention can efficiently and economically process such high water content feedstocks to not only recover the solids content in the form of a final product, but to also recover the process water, which can be recycled and reused. This invention can process and dehydrate high water content feedstocks efficiently and economically due to the fact that, in its preferred aspects, from a given combustion of natural gas fuel, the gas turbine generator provides both electric power for use or sale and heat for processing the feedstock, plus the excess steam produced in the dryer vessel can be used downstream, upstream or in other nearby operations, such as for preheating high water content feedstock, process heat, etc., providing additional operational fuel efficiency. This invention can be adapted as disclosed herein, to contain and process not only the water and solids but also the gases produced in a manufacturing operation. In some cases it may be desirable for economic operation reasons to mechanically separate part of the water from high water content feedstock, e.g., by centrifuges, filters or presses, before processing the feedstock in the system of this invention. Such separated water can be recycled for use as disclosed above.

The term "gas turbine" is used herein to mean and include any turbine engine having a compressor turbine stage, a combustion zone and an exhaust turbine stage that is capable of producing exhaust gas temperatures of at least 500° F., preferably at least about 700° F., more preferably at least about 900° F. and most preferably greater than about 1,000° F. Gas turbines are the heat source preferred for use in this invention because of their efficient operation and high heat output. The gas turbine generator is further preferred for use in this invention due to the production of energy by the generator, which energy can be utilized or sold to improve the economics of the operation of the system of this invention. The generator will typically be an electric generator due to the convenience of using and/or selling the electricity produced. However, the generator can be any other type of energy generator desired, such as a hydraulic pump or power pack that can drive hydraulic motors on pumps, augers, conveyors and other types of equipment in the system of this invention or equipment in other nearby operations. The heat requirements and the system economics will determine whether a gas turbine or gas turbine generator is used. If it is desired to have higher temperature exhaust gases and higher heat output from a given smaller size gas turbine, it may be desired to use a gas turbine instead of a similar size gas turbine generator. Compared to the gas turbine, the gas turbine generator further expands and cools the exhaust gases in absorbing energy to drive the generator, where in a gas turbine that energy is contained in higher temperature gases available for use in the dryer vessel of this invention. This can be an option when it is economically more important in the practice of this invention to have small (truckable) high temperature units than to have the revenue stream or economic benefit of the electricity or other energy production by the gas turbine.

The gas turbine or gas turbine generator useful in this invention can be fueled from any available source with any suitable fuel for the particular gas turbine and for the process equipment designed according to this invention. The preferred and conventional fuels are sweet natural gas, diesel, kerosene and jet fuel because the gas turbines are designed to run most efficiently on good quality fuels of these types and because of their common availability, particularly at remote agricultural operations, where the units of this invention are often most efficiently located. However, other fuels that can be used to fuel the gas turbine include methane, propane, butane, hydrogen and biogas and bioliquid fuels (such as methane, oils, diesel and ethanol). Since the system of this invention does not produce a biofuel, the fuel for the gas turbine used in this invention must be available at the local site where this invention is utilized. If fuel is not available locally, a fuel such as diesel can be trucked to the site as needed.

Examples of commercially available gas turbines and gas turbine generators useful in the present invention include the following (rated megawatt (MW) outputs are approximate):
Rolls Royce Gas Turbine Engines Allison 501-KB5, -KB5S or KB7 having a standard condition rated output of 3.9 MW
European Gas Turbines Tornado having rated output of 7.0 MW
Solar Mars 90 having rated output of 9.4 MW and Solar Mars 100 having rated output of 10.7 MW
Solar Tarus 60 having rated output of 5.5 MW and Solar Tarus 70 having rated output of 7.5 MW
For a nominal solids product output capacity of 2.5 metric tons/hr. (2,500 kg/hr) a gas turbine generator size of about 4 MW can be used, depending on the heat insulation and heat recovery efficiencies designed into the overall system. For small single semitrailer or truck systems, the units may be scaled smaller. For smaller product output systems, such as an 0.3 metric ton/hr product output, small gas turbines, such as Solar Saturn 0.8 MW, Solar Spartan 0.2 MW or Capstone 0.5 MW or 0.3 MW generators, can be used depending on system efficiencies and required heat input ranges. For large industrial installations, where there is no interest in moving the system of this invention between facilities, the gas turbine generator can be any large size suitable for permanent installation at the facility, such as a 10 MW, 20 MW or 40 MW unit, or larger. It will be recognized that systems according to this invention can also be designed to utilize the exhaust gas heat from reciprocating engines, such as gasoline or diesel generators.

The dryer vessel employed in this invention can be any type or configuration that is suitable for drying the high water content feedstock available and that can be adapted for receiving the gas turbine exhaust gases and receiving the high water content feedstock without allowing a significant amount of outside air to enter the drying chamber in the dryer vessel where the exhaust gases contact the high water content feedstock. The objective of the design of the gas turbine exhaust connection to the dryer vessel for purposes of this invention is to preclude any significant outside air from entering the dryer vessel to help prevent significant oxidation of the high water content feedstock. As previously pointed out, this is preferred to preserve the organic matter, carbonaceous and/or nutrient values present in those types of high water content feedstocks, to prevent fires and to provide a safe operation. As used in this invention it is preferred and expected that the turbine will be operated at a conventional ratio of fuel to combustion air in order to produce the most efficient exhaust gas temperature (EGT) for the dryer vessel and to produce gases entering the dryer vessel that contain a minimum of free oxygen. It will be recognized by those skilled in the art from the disclosure of this invention, that alternate sources of hot gases other than a gas turbine can be used and connected to the dryer vessel, such as the exhaust from conventional oil or gas burners and reciprocating engines, provided they are operated at conventional combustion ratio conditions to minimize free oxygen, or at stoichiometric ratio for no free oxygen, in the exhaust and are connected to the dryer vessel in a fashion that precludes significant outside air from entering the dryer vessel in order to preclude significant oxidation of the feedstock. Of course, such an alternate and additional source of hot gases can optionally be connected to the dryer vessel according to this invention and be used to supplement the exhaust gases output of the gas turbine in order to provide additional heat input capacity for the dryer vessel if needed for start up, shut down or surge load conditions or for backup in the event the gas turbine goes off line.

It will be recognized that in some operations of this invention, not all outside air can be excluded and oxidation of the high water content feedstock cannot be completely precluded, primarily because of the air present in and entrained in the high water content feedstock, the air dissolved in the moisture present in the high water content feedstock and excess oxygen that may be present in the turbine exhaust gases during periods that stoichiometric ratio of fuel and air is not employed. In addition, in some cases oxygen may be produced or liberated from the organic or other materials present in the high water content feedstock when the thermal treatment and conversion takes place and decomposes or converts such materials. Therefore, the terms as used herein which refer to "preclude introduction of air," "without significant oxidation," and the like, are used in the above operational context and with the recognition and intended meaning that the air or oxygen entering the system as part of the high water content feedstock or exhaust gases or produced in the thermal conversion process is not intended to be precluded and that the oxidation that may occur as a result of that air entering the system with the high water content feedstock is not intended to be prevented. However, such a level of oxidation is not considered significant within the scope, context and practice of this invention or the meanings of those terms as used herein. Similarly, "without significant pyrolysis" is used herein to mean that not more than an insignificant portion of the high water content feedstock is pyrolyzed, e.g., as in U.S. Pat. No. 6,039,774. Pyrolysis products are normally undesirable in the processes and products of the present invention, and the processes and equipment of this invention are operated to achieve the desired drying of the high water content feedstock and the desired conversion of various high water content feedstock components to the desired final products. Following the disclosures herein, it will be apparent to one skilled in the art for some applications of this invention, to control the exhaust gas temperatures, the contact times and/or residence times in the dryer vessel, the moisture content of the solids and of the vapor phase in the dryer vessel and other variables in order to process a particular high water content feedstock to achieve the desired results and to maximize the desired final products. In other applications of this invention the temperatures, contact times and other operating parameters of this invention can be adapted to achieve a desired level or degree of oxidation or pyrolysis, if the properties of the final product to be made using the systems of this invention require oxidation or pyrolysis of the feedstock.

Exclusion of outside air is also preferred for economic efficiency as well, because heating excess or outside air along with heating the high water content feedstock reduces the efficiency of the process. In some instances where the high water content feedstock is very low in moisture content or too dry for preferred operation of this invention, water can be added to the feedstock, to the turbine exhaust, to the turbine intake or to the dryer vessel to raise the moisture level in the dryer vessel to a level for efficient operation and to produce a solids material from the dryer vessel with a desired moisture content.

It will be recognized that the operation of the dryer vessel is normally to dry or reduce the moisture content of the high water content feedstock, but it is to also achieve the high temperature heating of the high water content feedstock to convert certain components and to achieve a chemical or thermal alteration in the feedstock to provide the content and properties desired in the final product. As noted, one aspect of this invention is the thermal conversion of the various components of the high water content feedstock without significant oxidation from the outside air. Although the range of components in high water content feedstocks are widely varied, it will be understood by one skilled in the art of conventional processing of a particular high water content feedstock how to effectively and efficiently employ this invention to improve the economics of the manufacturing operation processing that feedstock.

The types of dryer vessels that can be used in this invention are, for example, the following:

Rotary drum with or without internal scrapers, agitation plates and/or paddles

Stationary "porcupine" drum dryer with or without scrapers and/or agitator plates and/or paddles Triple pass stepped drying cylinder or rotary drum dryer systems with or without scrapers and/or agitator plates and/or paddles Rotary drum dryer systems with or without steam tubes and with or without scrapers and/or agitator plates and/or paddles Turbo-dryer or turbulizer systems Conveyor dryer systems with or without scrapers and/or agitator plates and/or paddlesIndirect or direct contact dryer systems with or without scrapers and/or agitator plates and/or paddles Tray dryers Fluid bed dryers Evaporator systems Baking ovens Examples of commercially available dryer vessels useful in or that can be adapted for use in this invention include:

Scott AST Dryer™ Systems

Simon Dryer Ltd.—Drum dryers

Wyssmont Turbo Dryer systems

Duske Engineering Co., Inc.

Energy Unlimited drying systems

The Onix Corporation dehydration systems

International Technology Systems, Inc. direct or indirect dryer systems

Pulse Drying Systems, Inc.

MEC Company dryer systems

Further examples of dryer vessels useful in or that can be adapted for use in this invention are disclosed in U.S. Pat. Nos. 5,746,006 to Duske et al. and 5,570,517 and 6,367,163 to Luker, the disclosures of which are incorporated herein by reference in their entirety.

As noted above the "dryer vessel" does not necessarily always function primarily as a dryer by removing moisture from the high water content feedstock in the system of this invention. The dryer vessel also functions as the thermal treatment/conversion/alteration vessel or oven in which the high water content feedstock is heated to sufficient temperatures for sufficient times to produce the desired final materials and products as disclosed herein. In addition, the dryer vessel need not provide direct contact of the turbine exhaust gases or other heat source and the high water content feedstock, but can provide indirect heating of the high water content feedstock to achieve the drying and/or thermal treatment/conversion/alteration desired according to this invention. The dryer vessel can be lined with appropriate material to prevent or reduce corrosion, erosion or excessive wear. It will be recognized that the systems of this invention can be adapted to perform various functions in various configurations in a particular installation or operation. For example, two dryer vessels can be operated in series where a high water content feedstock is dried in the first dryer vessel then the output from the first dryer vessel is thermally treated in the second dryer vessel to achieve the desired chemical or physical conversion or alteration. In such an arrangement, the exhaust gases can be supplied from a single gas turbine exhaust split between the two dryer vessels, or can be supplied by two separate gas turbines. From this example it can be seen that the processes, apparatus and systems of this invention can be adapted to operate various equipment components in series or in parallel to perform various processing functions desired following the teachings of this invention to achieve the effective and economic operation thereof.

Another aspect of the dryer vessel adapted for use in this invention is that the dryer vessel preferably also functions as the silencer for the gas turbine or other engine providing the hot exhaust gases. It is well known that gas turbines, (essentially jet aircraft engines), produce a high level of noise impact on the nearby environment. Stationary gas turbines used for electric power production or other purposes are usually required by local, state and federal regulations to have silencers installed to muffle the noise of the exhaust of the gas turbine to acceptable levels. Such silencers have the economic disadvantages of cost and creating back pressure on the gas turbine exhaust, which reduces the efficiency of the gas turbine operation. One advantage provided by this invention, due to the connection between the gas turbine exhaust and the dryer vessel preferably being closed to outside air, is that the dryer vessel functions effectively as a silencer for the gas turbine. This is at least in part a result of the internal configuration construction of the dryer vessel acting in combination with the presence of the high water content high water content feedstock, which combination is effective in absorbing and muffling the gas turbine exhaust noise. This is also due to the downstream end of the dryer also being closed to the atmosphere, because the steam and off gases from the dryer vessel are collected for condensation, cleaning, recycling and for heat recovery in the downstream processing in a closed system before being vented to the atmosphere. It will be apparent to one skilled in the art that capability for venting at various points in the process and the equipment system may be desirable to accommodate startup, shutdown, upset or feedstock variability, but will normally be operated as a closed system having only final product output and clean gas venting. The turbine exhaust can optionally be partially or temporarily wholly diverted to other downstream units, bypassing the dryer vessel, when needed for supplemental heat in other process units or for startup, shut-down or upset.

Another aspect of this invention is that the steam and off gases can be pulled from the discharge end of the dryer vessel by an appropriate fan, vent blower, etc., to provide a reduced pressure at the upstream entrance of the dryer vessel, thereby reducing the back pressure on the turbine exhaust. This increases the efficiency of operation of the gas turbine and is made possible because the connection between the gas turbine exhaust and the dryer vessel is not open to outside air. It will be understood that the commercial system design may include a vent or even a conventional silencer connected by tee or other configuration into the connection between the gas turbine exhaust and the dryer vessel for use during startup, shut down or upset operation, but would not be employed in the normal operating configuration for the process and apparatus of this invention as described above. To achieve best efficiency of operation of this invention, it is preferred that the connection between the gas turbine exhaust and the dryer vessel inlet have no obstructions in order to deliver the exhaust gases to the dryer vessel with a minimum of heat and energy loss between the gas turbine and the dryer vessel. It will also be recognized from this disclosure, that the operation of a gas turbine generator will preferably be controlled for optimal efficiency or economics for the high water content feedstock drying, thermal conversion, chemical alteration and other processing needs, which may not be the optimal or best gas turbine operating conditions for electricity production. The electricity production is a cost recovery revenue stream for the system, but the overall economics of the operation of this invention may be better under gas turbine operating conditions that favor optimum exhaust heat output for efficient dryer vessel operation and downstream production of products having desired properties and disfavor electricity production. Determination of such operating conditions for a particular installation of this invention will be apparent to one skilled in the art following the teachings herein. Gas turbine control systems of this type are disclosed in commonly assigned copending U.S. patent application Ser. No. 11/185,433 filed on Jul. 19, 2005, the disclosure of which is incorporated herein by reference in its entirety.

Another advantage provided by this invention results from the contact of the gas turbine exhaust gas with the high water content feedstock in the confined space of the dryer vessel without significant outside air present. The $NO_x$ and $SO_x$ emissions, and to some extent CO and $CO_2$ emissions, in the gas turbine exhaust are substantially reduced, and in some cases reduced to zero, by absorbing or complexing of the $NO_x$ and $SO_x$ components into the high water content feedstock, where they remain absorbed, complexed or fixed in the dried or treated material exiting the dryer vessel and in the product after processing into granular, pellet or prill or other form. This provides the advantage of both lowering or eliminating the emissions of $NO_x$ and $SO_x$ (and $CO/CO_2$) into the atmosphere and adding the nitrogen, sulfur and carbon components to the nutrient value of the product produced by the process and apparatus of this invention.

The operating conditions and procedures for the dryer vessel will be apparent to one skilled in the art following the teachings herein of the disclosure of this invention. The typical turbine exhaust gas temperature entering the dryer vessel will be in the range of about 500° F. to about 1,500° F., depending on moisture and other content of the high water content feedstock and the desired condition of the product output from the dryer vessel. In smaller systems with smaller engines, the inlet exhaust gas temperature can be as low as about 300° F. or about 350° F. A preferred range is from about 600° F. to about 1200° F., and it is more preferred that the inlet temperature be at least about 650° F. and most preferably at least about 700° F. The temperature and flow rate of the gas entering the dryer vessel will depend in part on the moisture content and other properties of the high water content feedstock. Higher moisture content will obviously generally require higher inlet gas temperatures to reduce the moisture content. It is believed that an additional efficiency is achieved in the systems of the present invention where high water content feedstock is contacted with high temperature gases. Such contact causes the formation, sometimes instantly, of superheated steam as the moisture comes out of the high water content feedstock, then that superheated steam heats and drives the moisture out of adjacent high water content feedstock. It is believed that this mechanism is responsible for quick drying of the high water content feedstock to a low moisture content so that the remaining residence time of the high water content feedstock in the dryer vessel contributes to the desired thermal treatment/conversion/alteration or "cooking" thereof according to this invention. Some high water content feedstocks may require lower temperatures but longer residence time to achieve the conversion or "cooking" needed to produce a product having self-binding or other desired properties. The temperature of the material exiting the dryer vessel will typically be in the range of about 150° F. to about 450° F. and preferably between about 200° F. and about 350° F. In some operations, the dryer vessel exit temperature of the material should be at least about 175° F. and preferably at least about 200° F.

As used herein the term "converted material" is used to refer to and means the dried high water content feedstock which is produced in the dryer vessel by reducing the moisture content of the high water content feedstock from an existing level to a lower level according to this invention and/or achieving the chemical alterations and conversions referred to herein. The "converted material" is considered an intermediate product that is suitable for further processing into a final product suitable for consumer, commercial or industrial use. Typically the converted material from the dryer vessel will be processed by milling to produce a powder or meal, followed by granulating, pelletizing or prilling of the powder or meal or to form flakes or other forms of the final product suitable for conventional handling, packaging and/or transport. The converted material can also be milled or otherwise powdered and made into a slurry or other liquid or pumpable product that can be recycled or used as needed. Local economics will have an impact on determining the end use to be made of the material produced from the dryer vessel or the final product produced from the system of this invention and whether the material from the dryer vessel is subjected to further processing.

As used herein the term "granule," "granulating" and the like refer to any granular form of the material or product produced by this invention, including conventional granules, powder, dust, crumbs and the like, produced by conventional granulation processes and equipment, including crushing or crumbling previously formed pellets or prills. The term "pellets," "pelletizing" and the like refer to any pellet form of the materials or products produced by this invention, including cylindrical, bullet, spherical or other shape, typically made by conventional pelletizing processes and equipment, such as by extruding a slurry or paste and cutting, chopping, or breaking the extrudate to the desired size. The terms "prills," "prilling" and the like refer to any prill form of the materials or products produced by this invention made by conventional prilling processes and equipment, including spray tower processes, freeze drying processes, etc. The terms "flakes" and "chips" and the like refer to any form of products like corn flakes, potato chips, corn chips and the like. Other forms of food products (human, pet or animal) include conventional nuggets, shaped products, like stars, etc., and the like.

An extrusion pelletizer is one of the preferred process units for use in connection with or as part of this invention, because it takes advantage of the self-binding properties of the material produced in the dryer vessel, and because it can be operated under temperature and pressure conditions that may provide or further contribute to the "cooking" of the material to produce the basic and/or enhanced self-binding properties of the product of this invention. In a typical operation, the material from the dryer vessel is milled, and the powder or meal from the milling unit may be mixed with steam or water, for example steam or condensed water vapor from the dryer vessel, sufficient to form material that is extrudable at high pressure and temperature to form pellets or other shapes. The heating and temperatures achieved in the extrusion pelletizer may be from heated screws, dies or drums or may be from the energy of high pressure compression. In either case the extrudable material is heated to a high temperature in the process. It is believed that for some high water content feedstocks that the high temperature and pressure in the extruder pelletizer may further "cook" or convert certain components in the material to provide or contribute to additional or enhanced self-binding properties of the resulting pelletized, granulated or prilled product. Typical operating conditions for such an extrusion pelletizer will be an extrudable material having moisture content of up to about 20% by weight or higher, depending on the extruder equipment employed. Extruder temperatures and pressure will be those normally used in conventional extruder equipment. Other operating conditions can obviously be employed depending on the high water content feedstock being processed and the desired properties of the formed product. The pellets produced may be dried to reduce the moisture content to a level suitable for stable product storage, e.g., about 10% by weight. The moisture removed at this point in the process can be recycled for use in other steps and processes of the systems of this invention, as disclosed herein.

The high water content feedstock will typically have a moisture content between about 50% and about 90% by weight, preferably between about 60% and about 80% by weight and most preferably between about 65% and about 75% by weight. (Percent by weight, as used herein, is in reference to percent of the component in question based on the total weight of the mixture referred to.) Although high water content feedstock of lower moisture content, for example, as low as about 40% by weight or even 30% by weight can be processed in this invention. The preferred high water content feedstock has a moisture content of at least about 50% by weight, more preferably at least about 60% and most preferably at least about 70% by weight. When the high water content feedstock has a high moisture content in this range, processing advantages are achieved from the essentially instant production of steam and superheated steam at the inlet of the dryer vessel where the 1,000° F. exhaust gases contact the high moisture high water content feedstock at atmospheric or subatmospheric pressure. The steam and superheated steam thus produced contributes to the drying, cooking and conversion of adjacent or nearby and downstream particles of high water content feedstock, which enhances the efficiency of the process. It is preferred for operation of the process and apparatus of this invention that the high water content feedstock be mixed and blended among batches or different parts (top, bottom, indoor, outdoor, etc.) of the same batches to provide a uniformity of high water content feedstock properties. This preferred preparation enables the production of a more uniform material from the dryer vessel, and simplifies control of the process operations. The temperature of the high water content feedstock will typically be ambient, i.e., in the range of about 30° F. to about 100° F., but can be lower than 30° F., provided that any frozen agglomerations do not interfere with the feedstock preparation or the operation of the dryer vessel and feedstock feeder equipment. The high water content feedstock may be used at any temperature direct from a manufacturing facility or from a process unit, which may be at an elevated temperature. The economics of the systems of this invention are usually improved if the high water content feedstock is at an elevated temperature or is preheated prior to introduction into the dryer vessel. If such feedstock preheating is employed, it may be done in any desired fashion, such as heat exchanger, solar heating, heated conveyers or augers or heated concrete slabs in the staging and feedstock preparation area, and may be done with heat recovered and recycled from the process systems of this invention.

The contact time between the turbine exhaust gases and the high water content feedstock will be determined by several variables including moisture content of the feedstock, moisture content desired in the dryer vessel output material, the chemical alteration/conversion desired, volume and temperature of the exhaust gases entering the dryer vessel and other factors. The contact time will be regulated to provide not only the drying desired, but also to elevate the particles of high water content feedstock solids to sufficiently high temperatures to sufficiently convert components present in the feedstock when such conversion is desired, and/or to produce a self-binding product, when desired. The actual temperature attained by the particles is not important to determine, so long as the desired levels of said component destruction and conversion, the desired level of self-binding or other desired properties are achieved. The desired contact time can be varied and regulated by the dryer vessel volume and size and by the throughput volumes of the feedstock and exhaust gases. The heat transfer from the exhaust gases to the feedstock, and consequently the temperature to which the feedstock is heated, will mainly be a function of the mass ratio of exhaust gas to feedstock. An example of the dryer vessel operation with a gas turbine generator is a Rolls Royce Allison 501-KB5 generator (rated at 3.9 MW) having an exhaust gas output of about 122,000 lb./hr. at 1,000° F. and connected to a Scott Equipment Company, New Prague, Minn., USA, rotary tubular dryer model AST 8424 having an internal volume of about 26 cubic meters ($m^3$). The high water content feedstock is material in small particle size and having a moisture content of about 70% by weight and a temperature of about 65° F. and is fed to the dryer vessel at a rate of about 6,500 kg./hr., which is about 10 $m^3$/hr., (about 16,200 lb./hr.) to provide an average or nominal residence time of the solids in the dryer vessel of about 10 to about 18 minutes and a weight ratio of exhaust gases to high water content feedstock of about 7.5. The dryer vessel output is at about 200° F. The weight ratio of exhaust gas to feedstock will generally be between about 15:1 and about 1:1, preferably between about 10:1 and about 3:1 and more preferably between about 8:1 and about 4:1. The heat requirement may call for a ratio of at least about 20:1 or at least about 25:1 or higher where the feedstock is cold with a very high moisture content and the exhaust gas is not at a high or maximum temperature. The exhaust gas flow and the high water content feedstock flow through the dryer vessel may be concurrent, countercurrent, single stage, multiple stage, etc., depending on results desired and various system designs and economic considerations.

The output from the dryer vessel comprises steam, water vapor, gas turbine combustion gases and solids that are dried and/or thermally treated and converted to desired forms. Typical dryer vessel outlet temperatures of the gases and/or solids will normally range from about 200° F. to about 350° F., but lower or higher temperatures may be selected and/or desired for economic, product quality and/or process efficiency reasons. The outlet temperatures can be from at least about 110° F. to at least about 500° F., preferably at least about 180° F. and more preferably at least about 200° F. It is generally desired that the solids material exiting the dryer vessel will generally have a moisture content between about 10% and about 15% by weight, but can range from about 5% to about 25% by weight. Again, lower or higher moisture content of the dryer vessel output solids may be selected and/or desired for similar reasons. The steam, water vapor and combustion gases exiting the dryer vessel will normally be routed through heat exchangers (for recovery of process heat usable downstream in granulating or pelletizing operations or upstream in feedstock or turbine intake air preheating), condensers (for recovery of process water for upstream or downstream use, for agricultural application or for disposal), scrubbers, filters or cyclones (for recovering solids entrained in gases or liquids and rendering gases and liquids environmentally acceptable for release) and other conventional process equipment.

The solids output from the dryer vessel, referred to herein as converted material, are typically further processed by milling, granulating, pelletizing, prilling, flaking or other processing to produce a final feed, fuel, recycle or other product in the form desired for packaging or bulk distribution, transport and use. Such milling, granulating, pelletizing or prilling equipment and operations useful in this invention are those that are conventional and well-known, since the output from the dryer vessel comprises solid and vapor components that lend themselves to such processing. Whatever the product in whatever form, the process, system and equipment of this invention provide for environmentally and economically effective processing of high water content feedstocks to remove them as environmental liabilities and provide products which are commercially useful, and to eliminate disposal in a municipal sewer or landfill. This invention can be used to produce a variety of products and materials from high water content feedstocks, but the preferred materials and products are those that have no significant undesirable components remaining that have not been converted or destroyed in the heating, chemically altering and/or drying treatment in the dryer vessel or other operations. The products and materials produced by this invention are preferred to be useful feed, fuel, recyclable or other products, but this invention is also useful in producing reduced-volume solids for disposal in landfill with the advantage of providing solids having low levels or no amounts of harmful components to leach out from the landfill into surface or ground water.

The products and materials produced by this invention are useful for and include blends with other materials, products or chemicals, as may be desired for particular end uses requiring particular properties or characteristics. Such other materials and additives can be added and blended at any appropriate point in the process: blended with the high water content feedstock, added to the dryer vessel, added in the process water at any point, added to the material exiting the dryer vessel, added as part of any milling, granulating, pelletizing, flaking or other processing or simply mixed with the final product or blended in before bagging or packaging or at the point of use. For example the final products, while usually relatively odor free, can be blended with other materials that can either provide a pleasant odor or provide flavoring as desired as well known in the food processing industry.

The systems of this invention include configurations that can be used to reduce and in some operations essentially eliminate the emission into the atmosphere of noxious odors and greenhouse gases from manufacturing facilities, referred to herein as "hazardous air pollutant" (HAP) emissions. Manufacturing operations are coming under increasing regulation by federal and state agencies due to increasing pressure from population areas near the manufacturing operations. The regulation is directed to two aspects of air quality. The first aspect is noxious odors in HAP emission gases, which contain mercaptans and many other organic compounds that have offensive odors and which are objectionable to residential communities. The second aspect is volatile organic compounds (VOCs) and greenhouse gas (GHG) emissions that are harmful to air quality and may or may not be noxious. Greenhouse gases include $CO_2$, $CH_4$, and $N_2O$ and are usually referred to in terms of $CO_2$ equivalent effect on the atmosphere. Methane (commonly released from processing facilities) has a $CO_2$ equivalent factor of about 23 (as used by the USDOE) which means that 1 kg of $CH_4$ released into the atmosphere is equivalent to 23 kg of $CO_2$ released. (Some sources give the equivalent factor as about 21.) While $CH_4$ is a greenhouse gas produced in many bioconversion operations, $CO_2$ and $NO_x$ gases are also produced. It is particularly desired to prevent $NO_x$ release into the atmosphere, because it is estimated to have a $CO_2$ equivalent of about 310. Ethanol is a VOC that is produced in many facilities including ethanol plants (manufacturing ethanol for fuel additive to gasoline), wineries, distilleries, bakeries, and other biomaterials manufacturing utilizing fermentation processes. This invention can be used, as disclosed herein, to essentially eliminate atmospheric release of HAP emissions by containing and processing the HAP emissions, alone or preferably in conjunction with processing of high water content feedstock to produce products.

The systems of this invention are particularly useful in essentially eliminating the release of HAP emission from manufacturing operations. In the basic system of this invention, a gas turbine is employed to control HAP emissions produced in a manufacturing operation, the gas turbine combustion air intake is connected to the manufacturing facility system producing or venting the HAP emissions so that the HAP emissions are directed into the gas turbine combustion air intake where one and optionally two processes normally will take place. First, the emission gases are burned along with the regular gas turbine fuel supply, thereby converting the $CH_4$ to $H_2O$ and $CO_2$ and converting the mercaptans and other noxious or acrid compounds to $H_2O$, $CO_x$, $NO_x$ and $SO_x$. Second, when an optional dryer vessel is connected to the gas turbine exhaust, the exhaust gases from the gas turbine are contacted with a high water content feedstock, where the $NO_x$ and $SO_x$ and to some extent $CO_x$ gases are absorbed into or complexed with the high water content feedstock as it is dried and/or thermally treated to form a converted material or to form a final product. This aspect of this invention prevents the HAP emissions from entering the atmosphere.

Existing manufacturing facilities can immediately directly and efficiently utilize this invention for control of HAP emissions by installing a gas turbine preferably a gas turbine generator, either a portable or permanent unit, and connecting at least some and preferably all the HAP emission source(s) in the facility to the turbine combustion air intake. Facilities that are enclosed and ventilated by fresh air inlets and exhaust air outlets, and particularly those that are climate controlled by heating and air conditioning, can additionally benefit from this invention where such ventilation air has HAP emissions present therein because at least a portion and preferably all, the ventilation exhaust air can be directed to the gas turbine combustion air inlet. In addition, facilities can be economically enclosed (e.g. by canvas walls) and ventilated by forced air (with or without climate control) to collect essentially all HAP emissions from the manufacturing operation and directing the ventilation air to the gas turbine combustion air intake. Of course, it is also preferred that the facility have the full economic advantage and benefit of this invention by including with the gas turbine generator a dryer vessel for dehydration and water removal in appropriate process streams or manufacturing steps in the facility, as disclosed herein.

In utilizing this aspect of this invention it will be recognized that it is preferably operated so that all the HAP emissions sources and/or the ventilation air exhausted from the manufacturing facility is fed to the gas turbine air intake to prevent release of HAP emissions to the atmosphere. Any remaining combustion air needed for the gas turbine will be from ambient air through a conventional air filter, although it is also preferred that the HAP emissions sources and the facility ventilation air also pass through the gas turbine intake air filter to prevent damage or erosion of turbine components by entrained dust or other particles. The solids collected in the air filter can be fed to the dryer vessel or to other process units in the system for incorporation into the final product produced by the systems of this invention. Although the methane or other oxidizable gases in the emission gases will not normally constitute a significant portion of the fuel requirements of the system of this invention, it is burned to produce heat and is not released to the atmosphere. Nevertheless, every kg of emission gas burned reduces the outside gas turbine fuel requirement by an equivalent kg. It will be recognized that one of the principle environmental benefits provided by this invention is the conversion of HAP emission components, including such VOCs as methane, ethanol, methylethylhetone and the like, that are very harmful to the atmosphere, to $CO_2$ and other compounds that have minimal impact on the atmosphere. In addition, when the preferred aspects of this invention are employed utilizing the water removal and dehydration processes and apparatus of this invention, the contacting of the gas turbine exhaust gases with the high water content feedstock will absorb or "scrub" at least a portion of $NO_x$, $SO_x$, and $CO_x$ and other compounds resulting from conversion of HAP emissions in the gas turbine combustion from the exhaust gases and retain those compounds in the water removed or in the resulting stream containing the solids of the feedstock, thereby preventing those resulting compounds from being released into the atmosphere. In any case, these aspects of this invention can be operated so that essentially all the HAP emissions are destroyed, as will be apparent to one skilled in the art following the disclosure herein.

It will also be recognized that, while the above description is in terms of using a gas turbine, the same utilization of this aspect of this invention to control HAP emissions can be made using whatever heat source is selected for use in the system. Whether the heat source is a gas turbine, gas turbine generator, reciprocating gas or diesel engine or even a conventional oil or gas burner (like 107 in FIG. 1), the manufacturing facility exhaust ventilation air and/or HAP emissions stream or vent can be directed to the combustion air intake so the HAP emissions are burned and preferably so the combustion gases are contacted with the high water content feedstock.

As further disclosure and illustration of the processes, systems and equipment of this invention, reference is made to the schematic flow chart of FIG. 1. In the exemplary process illustrated, gas turbine generator unit 100 comprises gas turbine 101 and electric generator 102. The gas turbine has air intake filter 104 and fuel feed 103. If desired, optional bypass exhaust silencer 106 can be included for startup, shutdown or upset conditions during those times the gas turbine is running but the exhaust gases cannot be directed into the dryer vessel. However, dryer vessel 200 will function as the silencer in the normal operation of the system of this invention. Alternatively, instead of silencer 106, the exhaust gas bypass (see 908 in FIG. 5) around the dryer vessel can be directed to any appropriate downstream unit, such as separator 208 and/or separator 600, which can provide a temporary silencer function. This arrangement eliminates the cost of a separate silencer and the space required for a separate silencer, which is an important consideration for the portable, truck-mounted systems. The gas turbine 101 exhaust is connected to the dryer vessel 200 by connector 105. An optional air inlet (not shown) can be included for dryer vessel 200 in connector 105 or elsewhere for purging the dryer vessel or the system, for startup or shutdown or for other reasons, particularly when either the exhaust gases or the high water content feedstock is not present in the dryer vessel 200. However, when both are present, any such air inlet is closed and not used in order to substantially preclude introduction of air into the dryer vessel and to preclude significant oxidation of materials being processed in the dryer vessel 200. Optional burner 107 can also be included to provide supplemental heat source and combustion gases for the dryer vessel, which can be provided for input in connector 105 or elsewhere. The optional supplemental heat source may be useful during startup, shutdown, process upset, turbine outage or to maintain desired throughput when a peak load or unusually high water content feedstock is encountered.

The high water content feedstock is typically introduced into the system by mechanical means, such as pump, auger or whatever is appropriate for a particular feedstock. In this illustration and example, a front end loader 201, drops a solid, high water content feedstock into a rock separator, mixer, chopper unit 202. The feedstock can be further mixed and foreign objects separated in screw conveyers 203, 204 then fed to the dryer vessel 200 through 215. The feedstock can also be pre-mixed or conditioned for desired uniformity prior to loading into this system by loader 201, e.g., in storage windrows that can be combined and mixed. In other operations, the high water content feedstock that is either liquid or slurry or does not contain foreign objects that need to be removed can be fed directly into the dryer vessel 200 via inlet 215.

The output from the dryer vessel 200 is transferred by conduits 205, 206 to separator 208 where the solids and gases are separated. The gases pass through 209 and blower 210 to the atmosphere via 211 or to other downstream processing via 212. Blower 210 can be operated to lower the pressure in separator 208 and in the dryer vessel 200, which will reduce the water boiling point in the dryer vessel and will reduce the water boiling point in the dryer vessel and will reduce the backpressure on the turbine exhaust and increase the turbine output and efficiency. Alternatively, blower 210 can be operated to maintain increased pressure in dryer vessel for higher temperature treatment, conversion or "cooking" of the high water content feedstock is desired. The output from dryer vessel 200 can pass through optional heat exchanger 207 for recovery of process heat for use downstream or in preheating the high water content feedstock or turbine intake air. The solids output from separator 208 pass to ball mill or hammer mill 300 via conduit, conveyor or auger 301 and optional mixers and conditioners 302 and 303. In addition, recycled solids, such as fines, from recycle loop 305 can be mixed in at 303 via 304 to be combined for feeding to the ball mill or hammer mill 300. The fines and off spec material generated at various points in the system can be collected and recycled via loop 305 and reintroduced into the product processing system at any desired point for further processing, such as the milling unit 300 via 304, the pelletizing unit 400 via 404 or even the high water content feedstock preparation 202, 203, 204 or other points. An important capability of the system of this invention is the complete recycle via recycle loop 305 of all fines or off spec solids so that they are eventually incorporated in the final products. Thus, the system of this invention provides 100% conversion of the high water content feedstock solids (except for rocks and other foreign objects that are not processable) into the final products and does not produce a solids waste stream that must be otherwise disposed of, such as in a landfill.

The ball mill or hammer mill 300 is used when needed to produce a uniform small particle size, short fiber length material called "meal" which is suitable for processing in pelletizer unit 400 to provide a product that has sufficient hardness and mechanical durability and stability for the conventional processing, packaging and storage normally used for dry products. The output of ball mill or hammer mill 300 goes through separator 310 where vapors are taken off and sent via 315 to separator 600 for recycle of solids via recycle loop 305 and venting of vapors to the atmosphere via blower 601 and vent 602. Separator 310 takes out fines or material suitable for recycle via recycle loop 305 and passes the meal to mixer 311. The meal is then sent via 312 to separator 401 and either direct to pelletizer 400 via 408 or to holding or surge bin 402 via 409a and 409b for mixing with other materials, recycle materials from 404 or additives or for holding in case of process startup, shutdown or upset. From surge bin 402 the meal is sent through mixer 403 and either directly to the pelletizer unit 400 via 417 or to mixer 311 via 412 for mixing with fresh meal when desired.

The pellets from pelletizer 400 are passed through heat exchanger, vapor removal unit 405 and from there sent via 406 and 414 either direct to final product cleaning in units 407 and 415 and finished product shipping or storage bin 500 via 416a, 416b, 501 and 503, or sent via 413 and surge bin 410 to a crumbler or granulator unit 411 then to final product cleaning units 407 and 415. The final product is loaded in truck 502 via 501, 503 or via storage bin 500 for transport to market. The fines and off spec product separated out in final cleaning unit 415 can be recycled for reprocessing via recycle loop 305. The crumbler or granulator 411 converts the pellets to smaller particle or granular size having essentially the same hardness and mechanical durability and stability as the pellets. The solids can be transported between processing units of this invention by conventional augers, elevators, conveyor belts, pneumatic tube conveyors and the like, as appropriate for the material and for environmental considerations. As is apparent, the system can be designed and configured to produce a material or product from dryer vessel 200 (that can be baled for direct use), meal from mill unit 300 (that can be bagged for later processing or for direct use) or a granular product, a pellet product or a prill product from 415.

An example of the operation of the system according to this invention can be seen from the following table. This example is based on the use of a Rolls Royce Allison 501-KB5 (rated at 3.9 MW) gas turbine generator and a Scott Equipment Co. dryer model AST 8424 processing a high water content feedstock in the form of a processed slurry or paste to produce a protein source pet food product.

Example of System Sized for Nominal 2.5 Metric Tons/Hr Finished Product

| FIG. 1 Stream No. | Component | Flow Rate | | Condition |
|---|---|---|---|---|
| 103 | Natural Gas | 820 | kg/hr | Ambient Temp. |
| 104 | Combustion Air | 48,140 | kg/hr | Ambient Temp. |
| 105 | Exhaust Gases | 48,960 | kg/hr | 1,200° F. |
| 215 | High Water Content Feedstock | 6,500 | kg/hr | 70% $H_2O$/ Ambient Temp. |
| 200 | Residence Time | 10-18 | min. | |
| 301 | Dried Material | 2,730 | kg/hr | 12% $H_2O$ by wt. 200° F. |
| 312 | Meal | 2,500 | kg/hr | 10% $H_2O$ by wt. 125° F. |
| 503 | Pelletized Product | 2,500 | kg/hr | 12% $H_2O$ by wt. 15° F. above Ambient Temp. |

Figure 2:
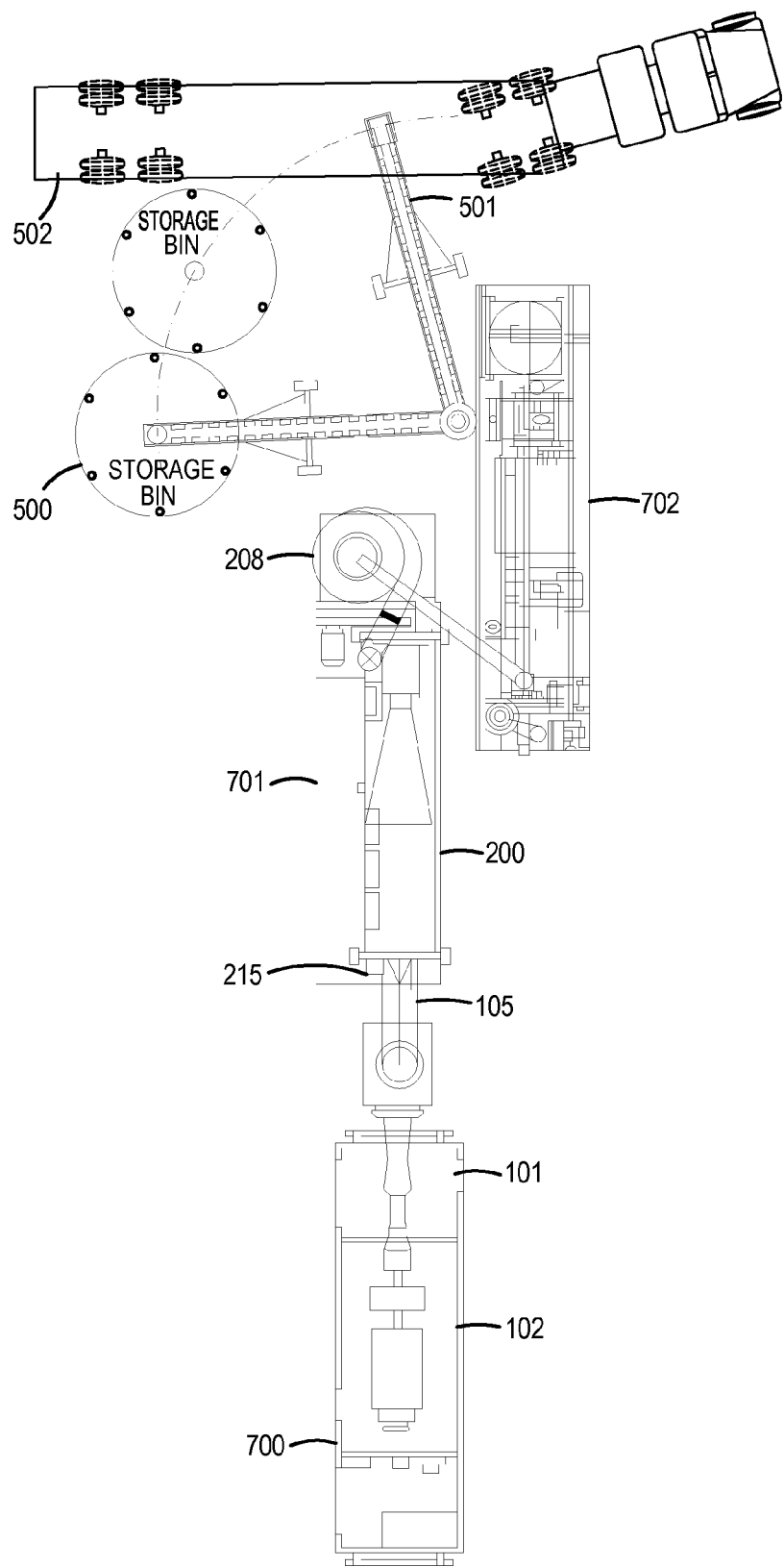
FIG. 2 is a plan view of the process units according to this invention in the form of portable skid-mounted, truckable units.

FIG. 2 illustrates one configuration of the system of this invention in the form of skid-mounted, truck mounted or rail car mounted units that can be transported to and operated at desired manufacturing operation sites where high water content feedstock is available on a daily or periodic basis and on a temporary or permanent basis. The first unit 700 comprises the gas turbine 101 and generator 102. The second unit 701 comprises dryer vessel 200 and separator 208. The dryer vessel 200 has high water content feedstock inlet 215 and is connected to the gas turbine exhaust by connector 105 when stationary and in operation. The third unit 702 comprises the processing equipment desired for a particular operation, such as the ball mill and pelletizer. The product output is conveyed by 501 to storage units 500 or to truck 502 for transport to market. Optional equipment can also include units for bagging and other packaging of the final product for various markets.

Figure 3:
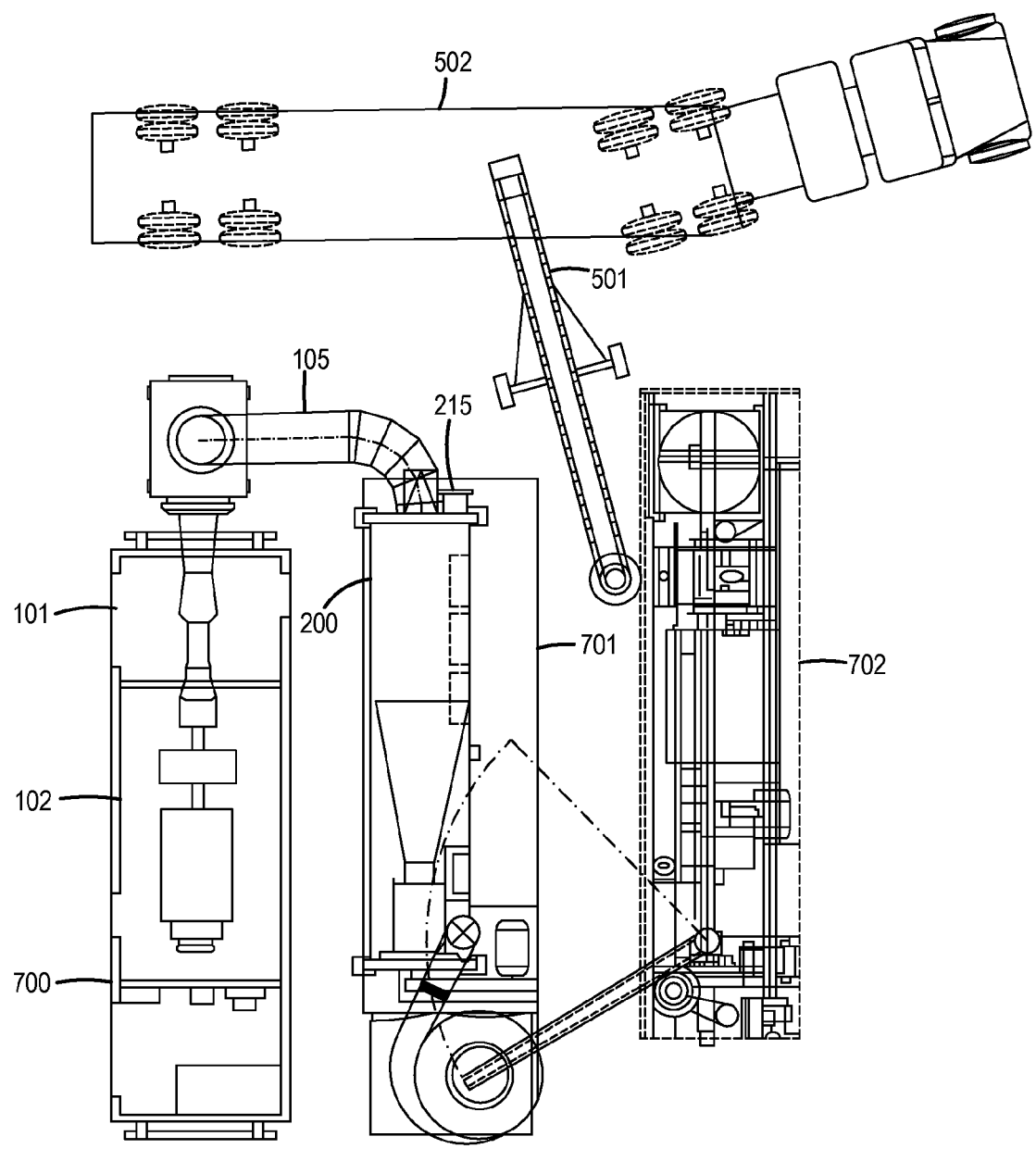
FIG. 3 is a plan view of the process units according to this invention in the form of portable skid-mounted, truckable units in another configuration.

FIG. 3 is an illustration of the same units as in FIG. 2, but positioned on the operation site in a different configuration. It is apparent that the portable, truck-mounted units of this invention are adaptable to a variety of sites that may have limitations on space available.

FIG. 4A is a plan view and FIG. 4B is an elevation view of another portable configuration of the system of this invention wherein all operating units are mounted on a single semi-trailer truck 800a and 800b. Gas turbine unit 100 exhaust is connected to dryer vessel 200 by connector 105. Dryer vessel 200 has high water content feedstock inlet 215 and is connected to separator 208 by conduit 206. Separator 208 is connected to vapor/air cleaner separator 600 by conduit 209 and separator 600 vents to the atmosphere by vent 602. The bottom outlet of separator 208 is connected via conduit 301 to ball mill unit 300. The outlet of ball mill unit 300 is connected via conduit 312 to pelletizer unit 400, which is connected to product cleaning unit 415 by conduit 414. Cleaning unit 415 has product outlet 416. Not shown in FIGS. 2, 3 and 4 is an optional enclosure for each skid-mounted or truck-mounted unit to enclose the entire unit for weather protection and for noise attenuation.

Figure 5:
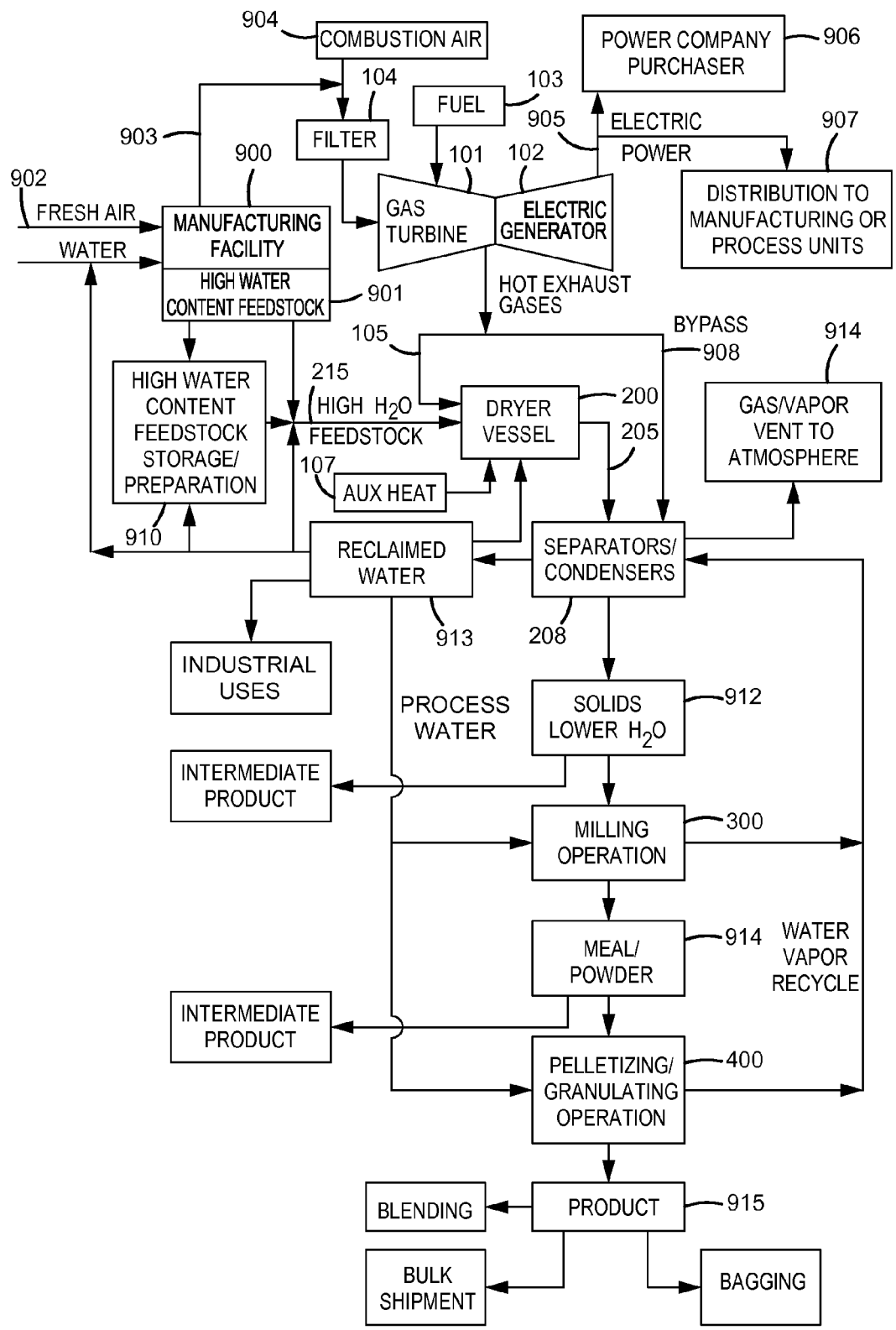
FIG. 5 is a schematic of processes for preventing HAP emissions and other gases to the atmosphere using the systems of the present invention.

FIG. 5 is a schematic process flow chart of some of the optional systems of this invention. Manufacturing facility 900 including an operation 901 involving a high water content feedstock and including fresh air intake 902 for process and/or ventilation use. Stream 903 is the HAP emissions and/or ventilation air which is fed to the gas turbine 101 as part of the combustion air feed 904 through air filter 104. The high water content section 901 can be within the same facility enclosure or can be separate holding tanks or other areas that are enclosed so that any HAP vapors given off by the feedstock can be contained and passed to the gas turbine 101 along with the facility HAP emissions and/or ventilation air intake 903 for combustion along with the conventional gas turbine fuel 103, such as locally available natural gas. This configuration of this invention can prevent HAP emissions from all the manufacturing operations in a facility from being released into the atmosphere. Not only does this provide the opportunity for commercial use of this invention to obtain air quality credits for reduced greenhouse gas emissions, it also provides manufacturing operations a way to become acceptable neighbors with nearby residential areas, because all HAP emissions can be contained within the system and converted to components that are not noxious or acrid before venting to the atmosphere.

The gas turbine generator 101/102 produces electric power 905, which can be either sold to the local power company 906 or distributed by 907 for use in the manufacturing operation or the processing units in the systems of this invention. Some manufacturing operations will find that the cost of enclosing an open manufacturing facility and installing and operating ventilation in order to contain and process all HAP emissions via 903 can be at least partially if not substantially offset by using the electricity 905 for operation of the ventilation system. For example, it may be feasible, or necessary in some instances due to governmental regulation, to cover a normally open manufacturing operation with inflatable tents, similar to those used for tennis courts, to provide economical systems for containing and collecting all HAP emissions from such an operation, so those gases can be processed via 903 according to this invention. The economics of each commercial operation, fuel costs, selling price/purchase price of electricity and capital cost of equipment will determine whether the electricity is used internally in the manufacturing operation, sold to the power company, used in the systems of this invention or used in other nearby operations or any combination thereof.

The exhaust gases from the gas turbine 101 are passed to dryer vessel 200 by a connection 105 that precludes outside air from entering the dryer. As disclosed herein, the system is operated so that the oxidation of the high water content feedstock in the dryer vessel 200 and elsewhere in the system is minimized and substantially avoided. The dryer vessel 200 also serves as silencer for the gas turbine. An optional bypass 908 can be provided so the exhaust gases can be sent to downstream equipment, such as separators/condensers 208, to silence the gas turbine exhaust when the dryer vessel is off line and to clean the exhaust gases before release into the atmosphere during such temporary operation. This bypass eliminates the cost of having a separate silencer to satisfy noise restrictions on the gas turbine when the dryer vessel is off line and provides a more compact design for portable or truck mounted units.

High water content feedstock 215 is fed to the dryer vessel 200 along with the exhaust gases from connection 105 and any auxiliary heat provided from alternate or auxiliary heat source 107. The high water content feedstock preferable comes directly from the high water content feedstock in 901 in facility 900 so it is fresh and has little or no time for bioconversion. Other high water content feedstock sources 910 can be used or included in the system, such as stockpiled feedstock or feedstock from other operations that is brought in to be combined or mixed with the feedstock from the immediate facility. While the invention is illustrated herein with an embodiment of a dryer vessel, it will be apparent to one skilled in the art other configurations and operating designs of this invention can be used depending on needs and configurations of the manufacturing facility employing this invention. For example, a paper, cardboard or drywall facility may have need to remove water from a slurry, mat or laminate on a moving belt instead of inside a dryer vessel per se. In such operation, the exhaust gases from the gas turbine can be directed through appropriate conduits for direct contact with the material (feedstock herein) on the belt to accomplish the desired water removal, dehydration and/or conversion of material as disclosed herein. In essence, in such configuration the entire enclosure around the belt and the area where the turbine exhaust gases contact the material on the belt becomes the "dryer vessel" for purposes of description of this invention.

The output from dryer vessel 200 is sent via 205 to the separators/condensers designed to separate the solids 912 for further processing downstream, to condense the water vapors as reclaimed water 913 and to clean the gases 914 vented to the atmosphere. The reclaimed water can be used downstream as process water, recycled for use in the manufacturing facility, for preparing or conditioning the high water content feedstock, used for industrial process water or other uses. The solids output 912 from the separator units 208 is normally further processed by milling, pelletizing, granulating, bagging, etc. However, the solids 912 can be used as an intermediate to form other types of products. For example, the dry material can be baled, formed into shapes, slurred for pumping, or can be used alone or in combination with other materials for incineration to utilize the fuel value of the material.

In each of the downstream operations, water vapor may be recovered and recycled to the separators/condensers 208 for reuse. As is apparent, the systems of this invention are adaptable to various configurations and various designs depending on the processing needs and economics of particular manufacturing operations. Various conventional heat recovery and recycle aspects, not shown in FIG. 5, can be designed into commercial installation of the systems of this invention by using ordinary process engineering design skills, including the fines recycle 305 shown in FIG. 1, use of gas/vapor stream 914 for various heat recovery and pre-heating applications, insertion of binders, additives and blending materials at various desired points in the system, cooling the combustion air 904 and/or facility HAP emissions 903, e.g., by water spray, to increase efficiency and power output of the gas turbines, mechanically pretreating feedstock for dewatering very high water content feedstock, etc., as will be apparent to one skilled in the art following the disclosure herein.

As will be apparent to one skilled in the art, multiple gas turbines, other engines and/or burners of the same or varying types and sizes can be manifolded together to feed multiple dryer vessels of the same or varying types and sizes in a single installation. This can be done to not only provide increased feedstock processing capacity but also to provide operation flexibility for processing varying feedstock loads and for performing equipment maintenance without shutting down the operation.

While we have illustrated and described various embodiments of this invention, these are by way of illustration only and various changes and modifications may be made within the contemplation of this invention and within the scope of the following claims.

We claim:
1. A method for treatment of high water content feedstock in a manufacturing facility comprising:
   operating a gas turbine producing exhaust gases;
   contacting the exhaust gases with high water content feedstock for a contact time sufficient to produce a dried material having a moisture content less than the feedstock, wherein contact between the exhaust gases and the high water content feedstock does not cause significant oxidation of the high water content feedstock; and
   directing HAP emissions produced in the manufacturing facility into the combustion air intake of the gas turbine, wherein the HAP emissions are from a different source than those produced by processing of the high water content feedstock.

2. A method according to claim 1, further comprising using the gas turbine to generate electricity.

3. A method according to claim 1, wherein the exhaust gases of the gas turbine directly contact the high water content feedstock.

4. A method according to claim 3, wherein at least one of $NO_x$, $SO_x$, and $CO_x$ gases present in the exhaust gases of the gas turbine are absorbed directly into the high water content feedstock during drying of the high water content feedstock.

5. A method according to claim 1, wherein the exhaust gases do not pass through an intermediate heat exchanger as the exhaust gases flow from the gas turbine to the high water content feedstock.

6. A method according to claim 1, wherein the exhaust gases contacting the high water content feedstock have a temperature greater than 700° F.

7. A method according to claim 1, wherein contact between the exhaust gases and the high water content feedstock does not cause substantial pyrolysis of the high water content feedstock.

8. A method according to claim 1, wherein contact between the exhaust gases and the high water content feedstock takes place in a dryer vessel.

9. A method according to claim 8, wherein the dryer vessel is connected to the gas turbine so as to substantially preclude the introduction of outside air into the dryer vessel when the exhaust gases are contacted with the high water content feedstock.

10. A method according to claim 8, wherein the dryer vessel is a rotary dryer vessel.

11. A method according to claim 8, wherein a temperature in the dryer vessel is at least 700° F.

12. A method according to claim 8, wherein the dried material and the exhaust gases exit the dryer vessel through a common outlet.

13. A method according to claim 12, wherein a dryer outlet conduit conveys the dried material and the exhaust gases from the common outlet of the dryer vessel to a solids/gas separator, wherein a blower draws the exhaust gases from the solids/gas separator and directs the exhaust gases to atmosphere, and wherein the blower reduces backpressure in the dryer vessel via the dryer outlet conduit.

14. A method according to claim 1, wherein the dried material includes fertilizer or soil builder.

15. A method according to claim 1, wherein the high water content feedstock has a moisture content of at least about 30% by weight before being contacted by the exhaust gases.

16. A method according to claim 15, wherein the high water content feedstock has a moisture content of at least about 50% by weight before being contacted by the exhaust gases.

17. A method according to claim 1, wherein the dried material has a moisture content less than about 20% by weight.

18. A method according to claim 17, wherein the dried material has a moisture content less than about 15% by weight.

19. A method for treatment of high water content feedstock in a manufacturing facility comprising:
   operating a gas turbine producing exhaust gases;
   contacting the exhaust gases with high water content feedstock for a contact time sufficient to produce a dried material having a moisture content less than the feedstock; and
   directing HAP emissions produced in the manufacturing facility into the combustion air intake of the gas turbine, wherein the HAP emissions are from a different source than those produced by processing of the high water content feedstock;
   wherein contact between the exhaust gases and the high water content feedstock takes place in a dryer vessel and the dried material and the exhaust gases exit the dryer vessel through a common outlet, wherein a dryer outlet conduit conveys the dried material and the exhaust gases from the common outlet of the dryer vessel to a solids/gas separator, wherein a blower draws the exhaust gases from the solids/gas separator and directs the exhaust gases to atmosphere, and wherein the blower reduces backpressure in the dryer vessel via the dryer outlet conduit.

* * * * *